United States Patent [19]
Horiki et al.

[11] Patent Number: 5,540,880
[45] Date of Patent: Jul. 30, 1996

[54] CORROSION, SOUND, AND VIBRATION-PROOF METHOD FOR METAL STRUCTURE

[75] Inventors: Seinosuke Horiki; Reiji Makino, both of Tokai, Japan

[73] Assignee: Nagoya Oil Chemical Co., Ltd., Tokai, Japan

[21] Appl. No.: 239,272

[22] Filed: May 6, 1994

Related U.S. Application Data

[63] Continuation of Ser. No. 6,681, Jan. 21, 1993, abandoned, which is a continuation of Ser. No. 507,146, Apr. 10, 1990, abandoned, which is a continuation-in-part of Ser. No. 231,196, Aug. 11, 1988, abandoned.

[30] Foreign Application Priority Data

Aug. 12, 1987 [JP] Japan .................................. 62-201309
Sep. 24, 1987 [JP] Japan .................................. 62-239249

[51] Int. Cl.$^6$ ........................................................ B05D 1/32
[52] U.S. Cl. .......................... 264/553; 427/272; 427/282
[58] Field of Search ............................ 264/51, 553, 554, 264/321; 427/272, 282

[56] References Cited

U.S. PATENT DOCUMENTS

| | | | |
|---|---|---|---|
| 3,137,747 | 6/1964 | Kline | 264/553 |
| 3,484,510 | 12/1969 | Corazza | 264/554 |
| 3,558,751 | 1/1971 | Santelli | 264/553 |
| 3,740,259 | 6/1973 | Carl et al. | 427/282 |
| 4,261,775 | 4/1981 | Tschudin | 264/554 |
| 4,714,633 | 12/1987 | Horiki et al. | 427/282 |

FOREIGN PATENT DOCUMENTS

| | | | |
|---|---|---|---|
| 57-103824 | 6/1982 | Japan | 264/553 |

Primary Examiner—Allan R. Kuhns
Attorney, Agent, or Firm—Thomas F. Moran; Donald S. Dowden

[57] ABSTRACT

In an operation wherein a metal structure has applied thereto a coating of visco-elastic material is a method of corrosion, sound and vibration-proofing and wherein selected portions or surfaces of the metal structure are protected from having the visco-elastic material applied thereto by placing a masking member on said selected portions or surfaces, the improvement which comprises employing as said masking members thin, thermoplastic foam-walled masking members, such as are manufactured by vacuum forming thermoplastic sheet or by expansion molding of expandable thermoplastic beads.

4 Claims, 25 Drawing Sheets

CORROSION, SOUND, AND VIBRATION-PROOF METHOD FOR METAL STRUCTURE

This is a continuation of application Ser. No. 08/006,681 filed Jan. 21, 1993 (abandoned) which in turn, is a continuation of Ser. No. 07/507,146 filed Apr. 10, 1990 (abandoned) which, in turn, is a continuation-in-part of Ser. No. 07231,196 filed Aug. 11, 1988 (abandoned)

BACKGROUND OF THE INVENTION

The present invention relates to the improvement in a method of corrosion, sound and vibration-proofing a metal structure wherein a coating of visco-elastic material is applied onto said metal structure and wherein selected portions or surfaces of said metal structure are protected from having the visco-elastic material applied thereto by placing masking members onto said surfaces or portions to be protected and the masking members then removed after the coating of said visco-elastic material has been applied to the metal structure. More particularly, the present invention relates to the improvement in a method of corrosion, sound and vibration-Drooling a metal structure, comprising employing as said masking members this thermoplastic foam-walled masking members.

Visco-elastic materials such as synthetic resin, rubber, asphalt are coated on the surface of a metal structure such as the underside of the floor of cars for the purpose of corrosion, sound, and vibration proofing. Said coating layer of visco-elastic materials covers the surface of said metal structure to protect said surface from flying stones; it seals the joined parts of the surface from water and corrosion. At the same time, said coating layer absorbs sound from the outside and vibration of the surface of said metal structure to exhibit a sound and vibration-proofing effect. Accordingly, said coating layer must be thick for a remarkable sound and vibration-proofing effect and usually the desirable thickness of said coating layer may be 500 to 2000 $\mu$. Therefore, said thick coating layer obstructs the firm attachment of parts such as bolts, nuts, brackets, frames and the like to the surface of said metal structure.

Further, said metal structure usually has many holes for cables, operation wires and the like, and for drainage and the like. In cases where said metal structure has holes, said visco-elastic material must be prevented from going into said holes when said visco-elastic material is coated on the surface of said metal structure. Especially in cars, said visco-elastic material must be prevented from going into the holes that are in the outer panel which would give a bad appearance.

Therefore, it is necessary to protect such portions or surfaces of said metal structure by masking members and then coat the surface of said metal structure with said visco-elastic material. After coating, said masking members may be removed from said portions or surface of said metal structure.

DESCRIPTION OF THE PRIOR ART

Hitherto, adhesive tapes have been used as a masking member to protect said portions or surfaces of said metal structure from the coating of said visco-elastic material. Namely, adhesive tapes are attached to said portions or surfaces of said metal structure to protect it from said coating and, after the coating, said adhesive tapes are removed from said portions or surfaces of said metal structure. Said portions or surfaces are not coated with said visco-elastic material since said portions or surfaces are covered with adhesive tapes during the coating.

Said adhesive tapes as masking members have faults. In cases where said portions or surfaces to be protected from the coating are wide, it is troublesome to attach adhesive tape to said portions or surfaces to be protected and remove said adhesive tapes from said portions or surfaces since a number of strips of adhesive tapes must be attached to said portions or surfaces to cover wholly said portions or surfaces, and further, in a case where said portions to be protected from the coating are protrudings, it is also troublesome to wind adhesive tapes over and over again around said portions to be protected and remove said adhesive tapes from said portions.

Still further, adhesive tapes attached to said portions and surfaces to be protected are buried in the coating layer and it is very difficult to find said buried adhesive tapes and, of course, it is very difficult to remove said buried adhesive tapes from said portions or surfaces.

Still further, it is very difficult to cover only necessary portions or surfaces of the metal structure by adhesive tapes resulting in that portions or surfaces which are not covered with the visco-elastic layer may remain.

Said faults may be very serious especially in such as an industrial automobile production operation in which many, a hundred or more, masking members are employed to protect certain selected portions and surfaces of the car body from the applied coating material employed in the corrosion, sound and vibration proofing operation wherein a coating of visco-elastic material, such as plasticized polyvinyl chloride, is applied as a coating onto the car body, such as a coating having a thickness of about 500–2000 microns. An improvement which comprises employing as said masking member panel type or plug type thermoplastic foam masking members has been provided [Horiki et al. U.S. Pat. No. 4,714,633 (1987)]. Said panel type or plug type thermoplastic foam masking members are molded by the expansion molding of an expandable thermoplastic beads. Said panel type or plug type thermoplastic foam masking members can be easily given shapes corresponding to said portions or surfaces of the metal structure so that said panel type or plug type thermoplastic foam masking members can protect only necessary portions or surfaces. Further said panel type or plug type thermoplastic foam masking members are thick so that it may be very easy to find said masking members buried in the coating layer and to remove said masking members from said portions or surfaces.

Nevertheless, as above indicated, the number of masking members employed to protect the underside of the car body before the coating operation can amount to about more than 100. After the coating operation, the thus-used masking members must be removed. These used masking members become scrap. As said masking member is made up of bulky material, such as the expanded polystyrene foam masking member, this means that a large volume and weight of the used scrap masking members must be disposed of, thereby creating a disposal problem, one which tends to adversely impact upon the environment. It must be remembered and realized that such scrap, thermoplastic-coated used foam masking member material is large in volume and weight. This used waste material represents a substantial cost because of the amount of thermoplastic material therein and, as indicated, the disposal of this used scrap masking member material presents a difficult disposal problem.

SUMMARY OF THE INVENTION

Accordingly, an object of the present invention is to save trouble when the masking member is attached/removed to/from said portions or surfaces to be protect. Another object of the present invention is to reduce bulk and weight to solve said difficult disposal problem. According to the present invention, there is provided the improvement which comprises employing as said masking members thin thermoplastic foam walled masking members, in a method of corrosion, sound and vibration-proofing a metal structure wherein a coating of visco-elastic material is applied onto said metal structure and wherein selected portions or surfaces of said metal structure are protected from having the visco-elastic material applied thereto by placing masking members onto said surfaces or portions to be protected and the masking members then removed after the coating of said visco-elastic material has been applied to the metal structure. Said thin thermoplastic foam walled masking members may be manufactured by the vacuum forming of the thermoplastic foam sheet such as a polystyrene foam sheet, a polyethylene foam sheet, a polypropylene foam sheet and the like, and one side or both sides of said thermoplastic foam may be laminated with a thermoplastic film such as polyethylene film, polypropylene film, polyvinylchloride film, polyamide film, polystyrene film, and desirably high impact polystyrene film. Further said this thermoplastic foam walled masking members may be manufactured by the expansion molding of the thermoplastic expandable beads such as polystyrene expandable beads, polyethylene expandable beads, and the like. Further said masking members may be colored by a suitable color if desired, for the purpose of selection of the specified masking member according to the part to be protected.

The visco-elastic material used in the present invention may be plastic, rubber, asphalt, pitch and the like, and a solution, emulsion, dispersion, liquid prepolymer of said visco-elastic material or molten visco-elastic material may be used in the case of coating. Said liquid of the visco-elastic material may be such as polyvinyl chloride paste, polyvinylchloride sol, an organic solution of polyacrylate, an organic solution of styrene-butadiene rubber, polyvinyl acetate emulsion, polyacrylate emulsion, styrene-butadiene rubber latex, an emulsion of ethylene-vinyl acetate copolymer, polyurethane emulsion, asphalt emulsion, petroleum resin emulsion, polyethylene emulsion, molten ethylene-vinyl acetate copolymer, molten asphalt, molten petroleum resin, molten polyethylene, urethane prepolymer, unsaturated polyester resin and the like. Two or more kinds of said visco-elastic materials may be mixed together in the present invention.

Further 3 is a partial side sectional view of the first embodiment of the present invention in the case of removing the masking member from the metal structure.

Figure 4:
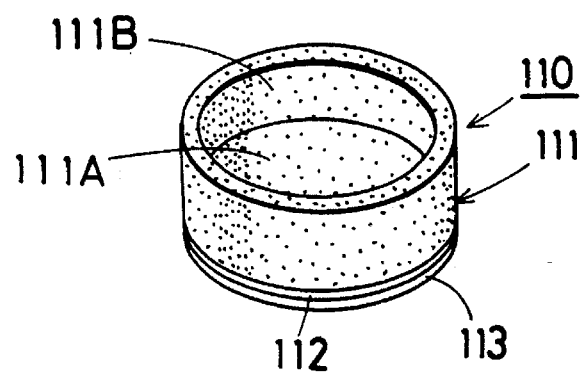

FIG. 4 is a perspective view of a second embodiment of the present invention.

Figure 5:
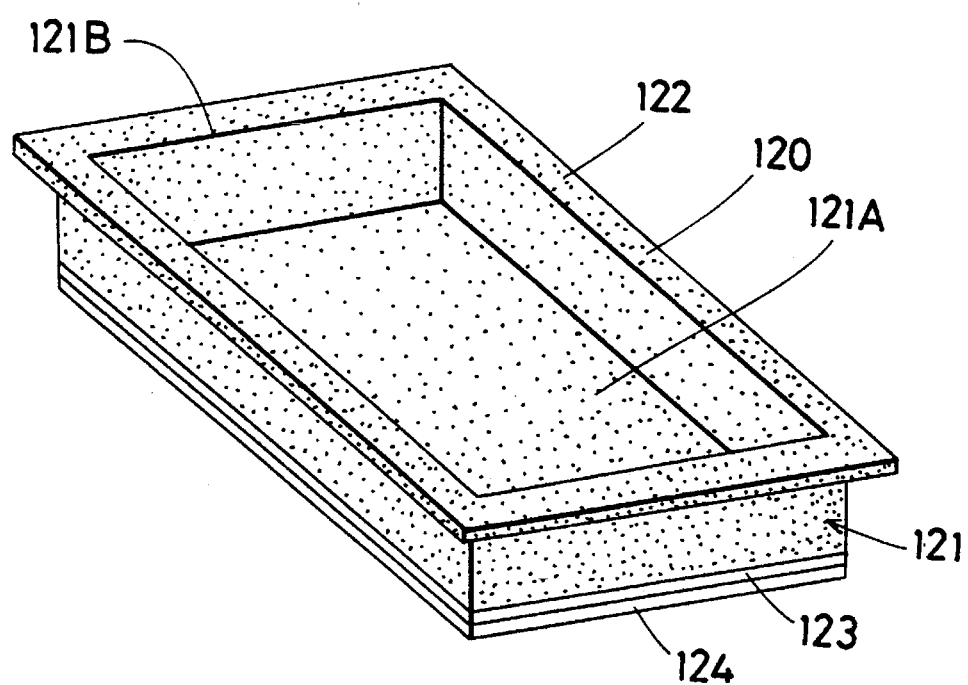

FIG. 5 is a perspective view of a third embodiment of the present invention.

Figure 6:
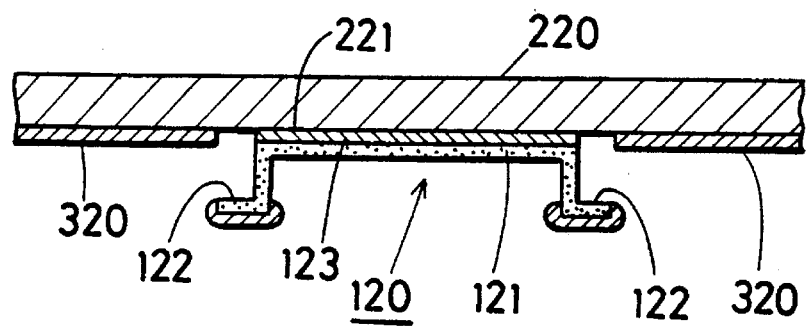

FIG. 6 is a partial side sectional view of the third embodiment of the present invention after coating of the visco-elastic material.

Figure 7:
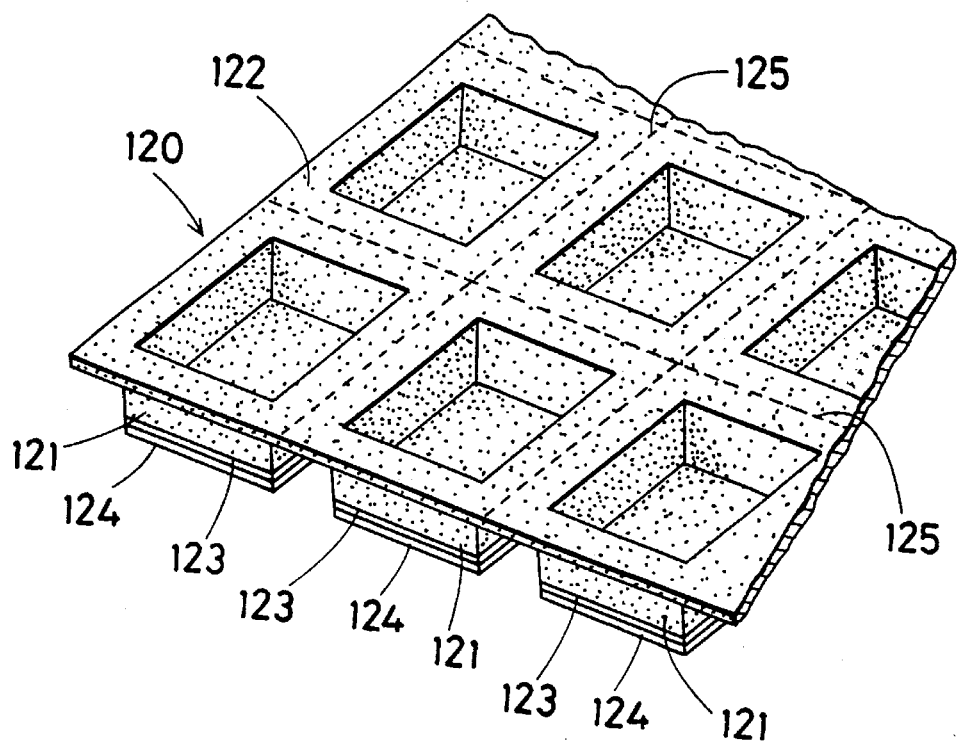

FIG. 7 is a partial perspective view of the third embodiment of the present invention in the case of said third embodiment being produced.

Figure 8:
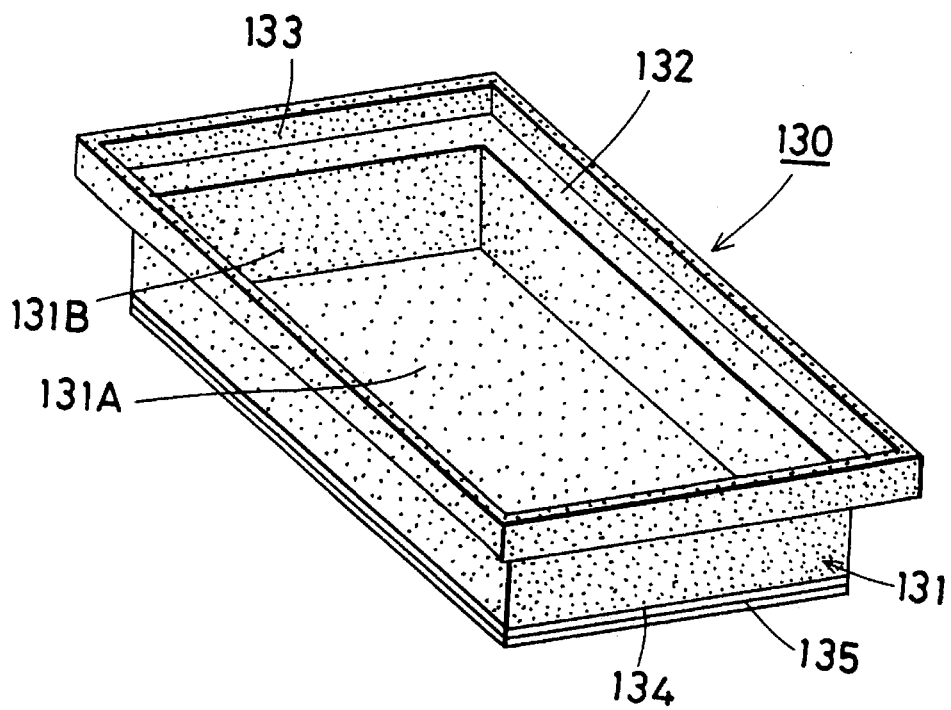

FIG. 8 is a perspective view of a fourth embodiment of the present invention.

Figure 9:
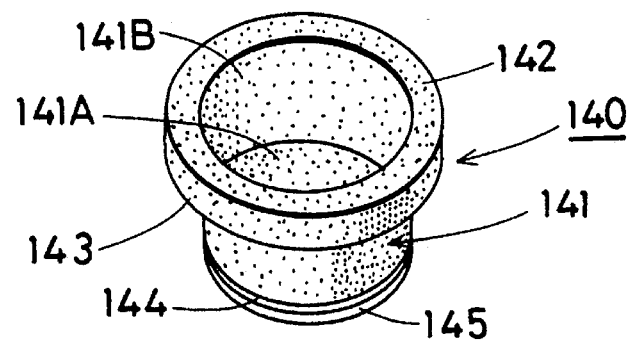

FIG. 9 is a perspective view of a fifth embodiment of the present invention.

Figure 10:
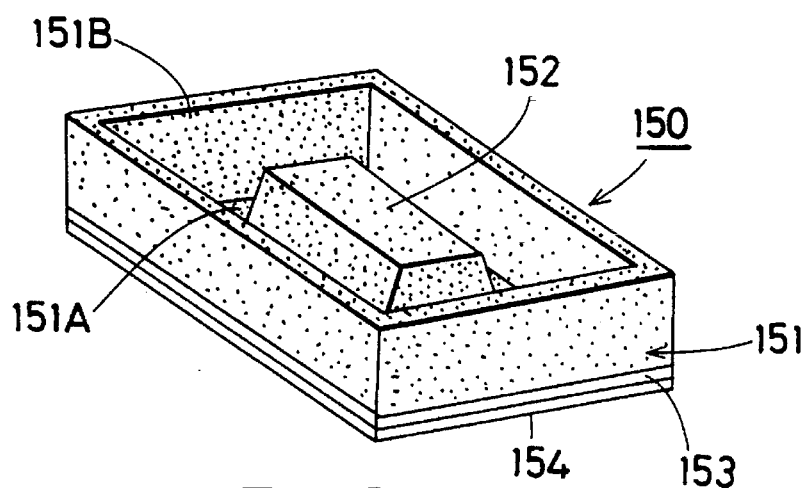

FIG. 10 is a perspective view of a sixth embodiment of the present invention.

Figure 11:
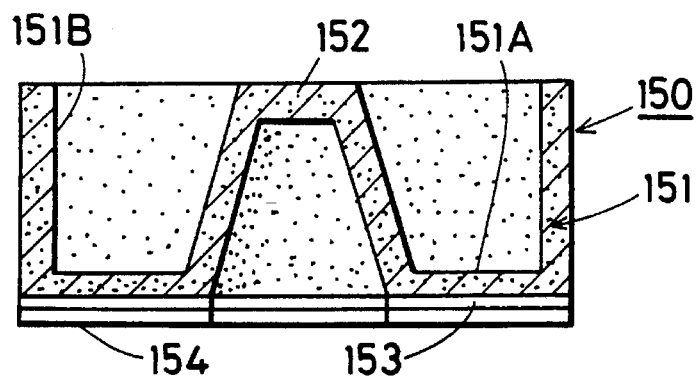

FIG. 11 is a side sectional view of the sixth embodiment of the present invention.

Figure 12:
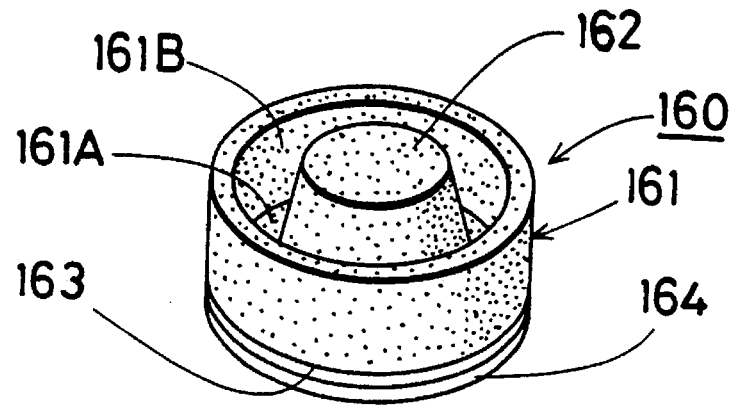

FIG. 12 is a perspective view of a seventh embodiment of the present invention.

Figure 13:
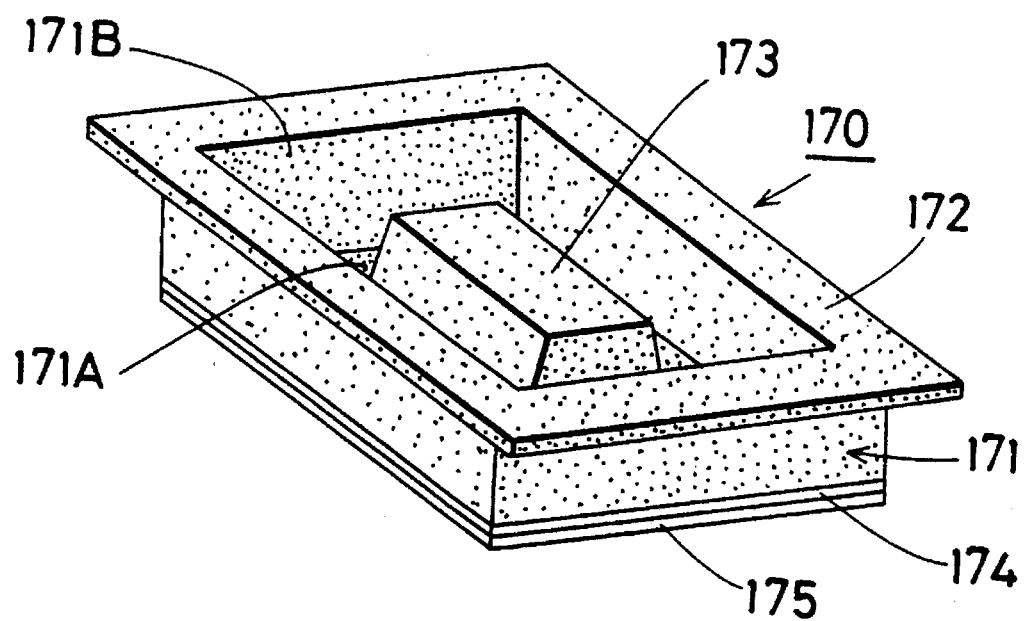

FIG. 13 is a perspective view of an eighth embodiment of the present invention.

Figure 14:
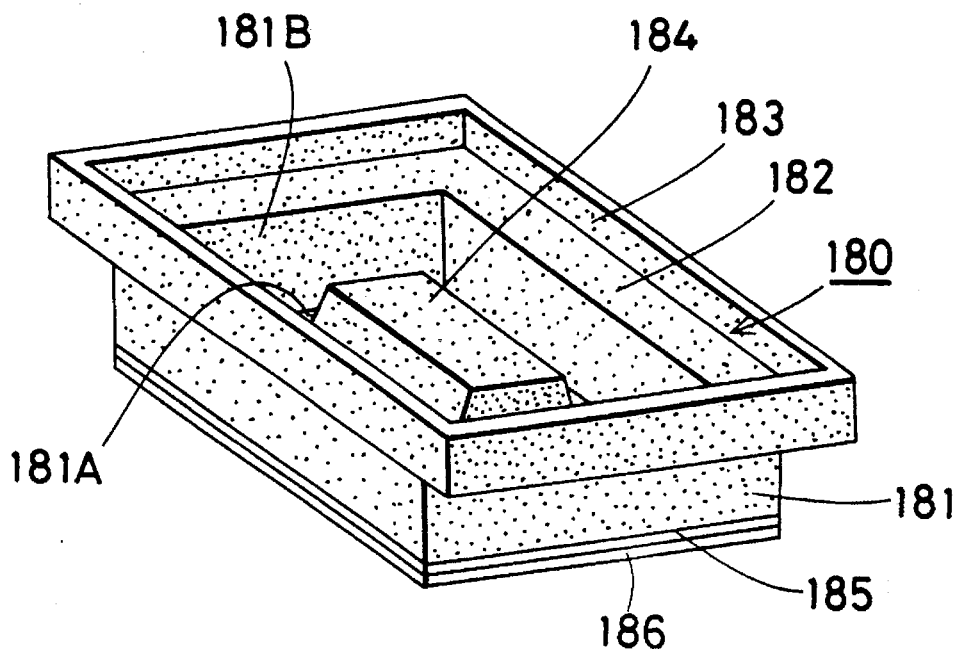

FIG. 14 is a perspective view of a ninth embodiment of the present invention.

Figure 15:
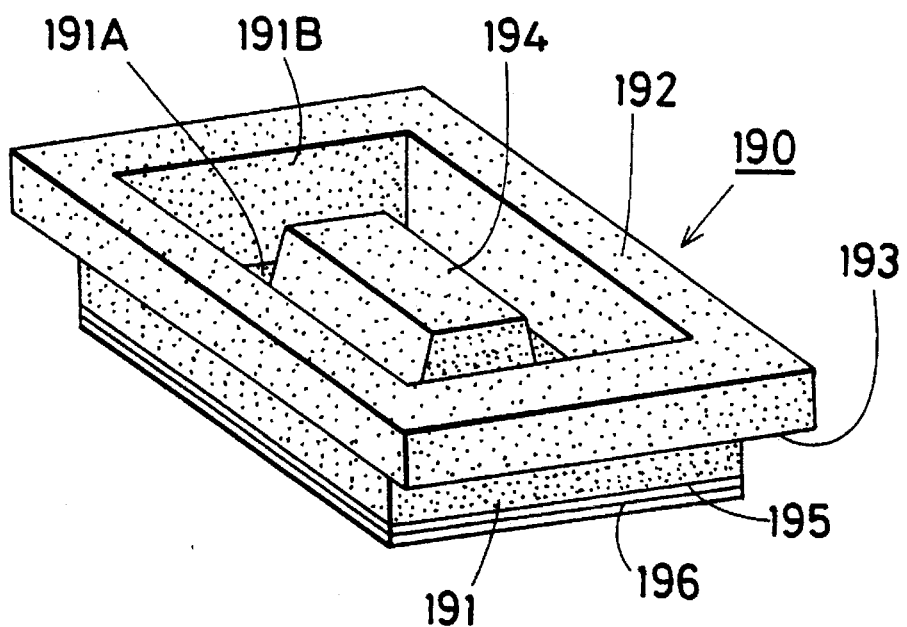

FIG. 15 is a perspective view of a tenth embodiment of the present invention.

Figure 16:
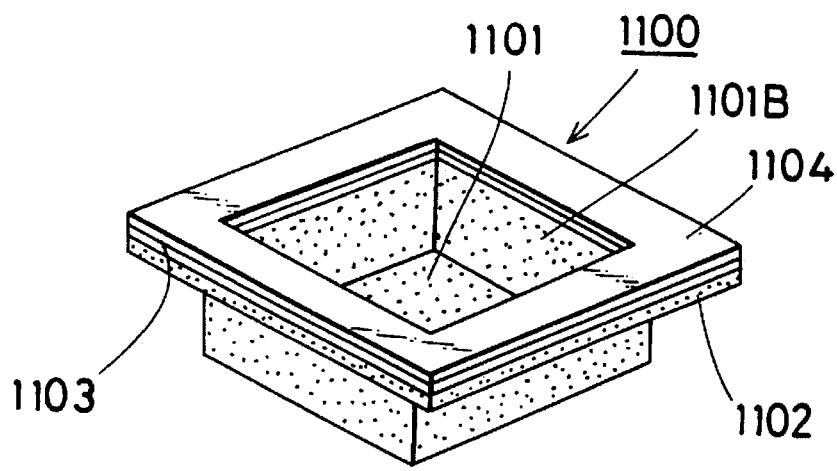

FIG. 16 is a perspective view of an eleventh embodiment of the present invention.

Figure 17:
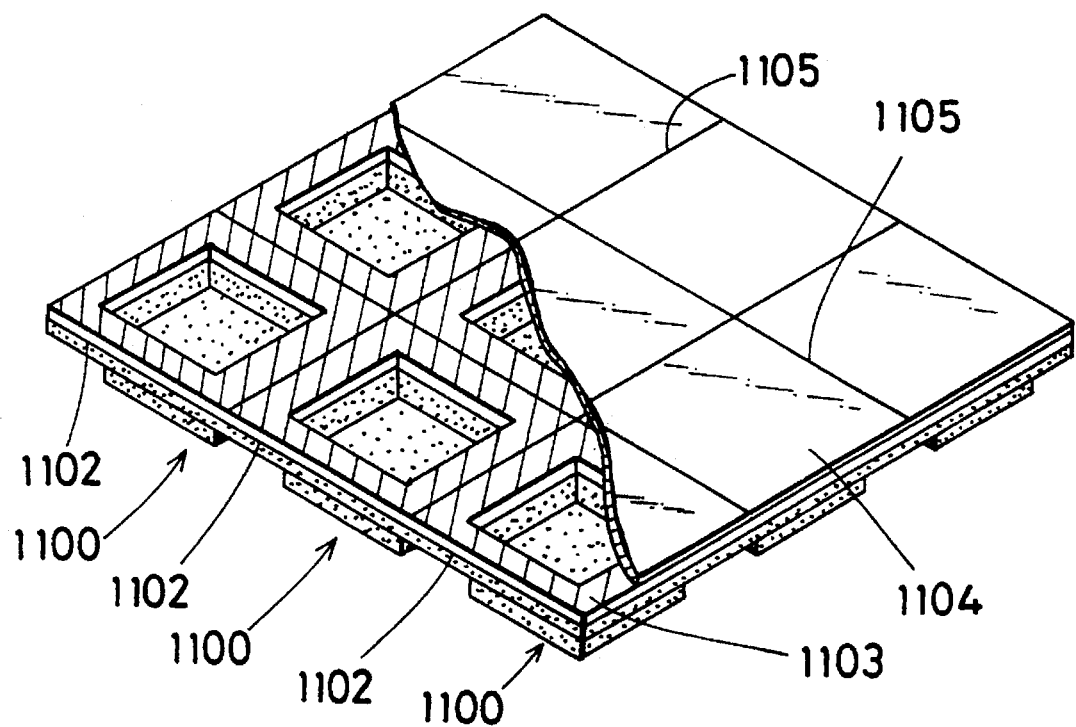

FIG. 17 is a perspective view of the eleventh embodiment of the present invention in the case of said first embodiment being produced.

Figure 18:
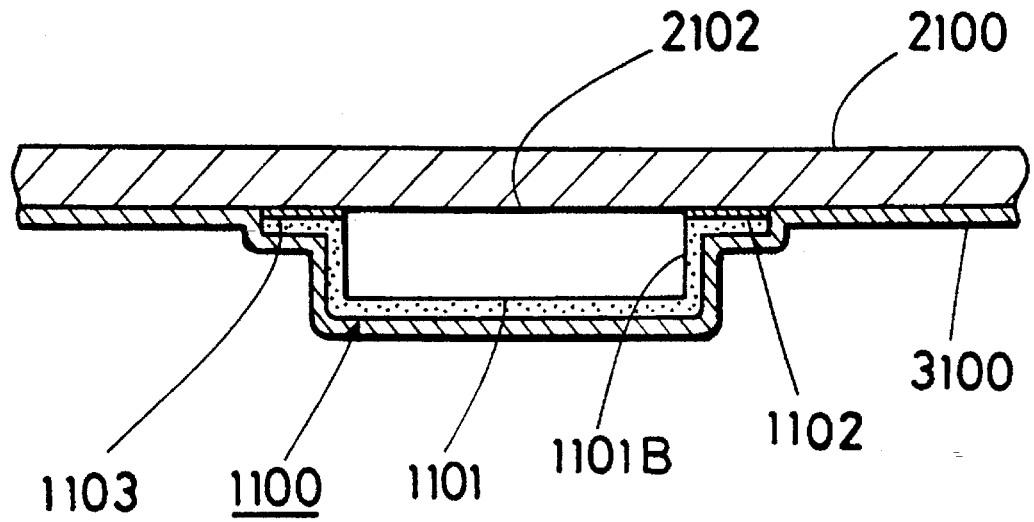

FIG. 18 is a partial side sectional view of the eleventh embodiment of the present invention after coating of the visco-elastic material.

Figure 19:
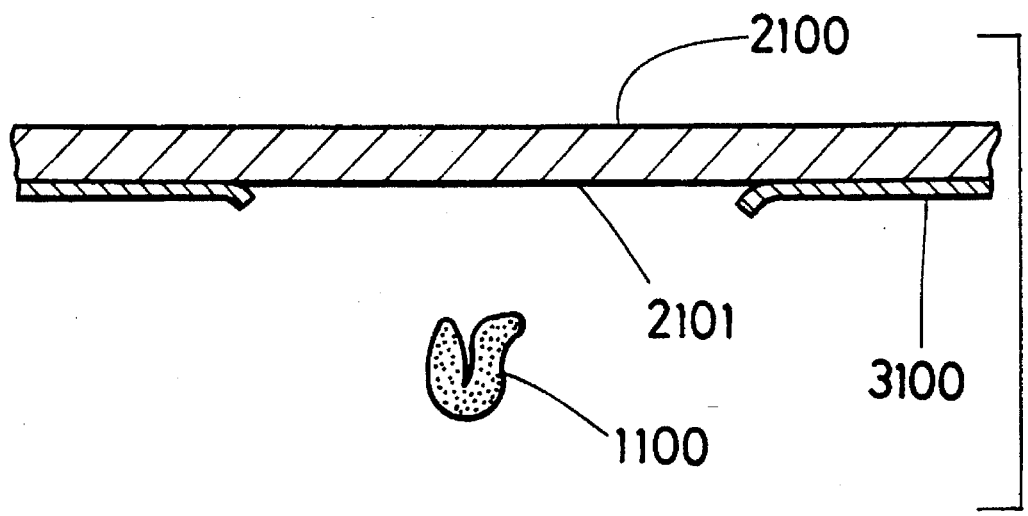

FIG. 19 is a partial side sectional view of the eleventh embodiment of the present invention in the case of removing the masking member from the metal structure.

Figure 20:
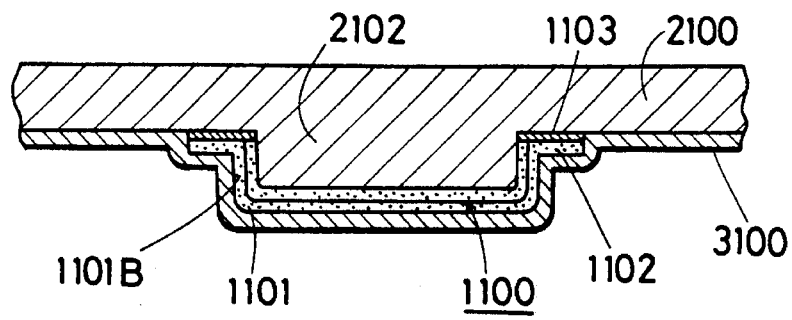

FIG. 20 is a partial side sectional view of the eleventh embodiment of the present invention in case of protection of a protruding part.

Figure 21:
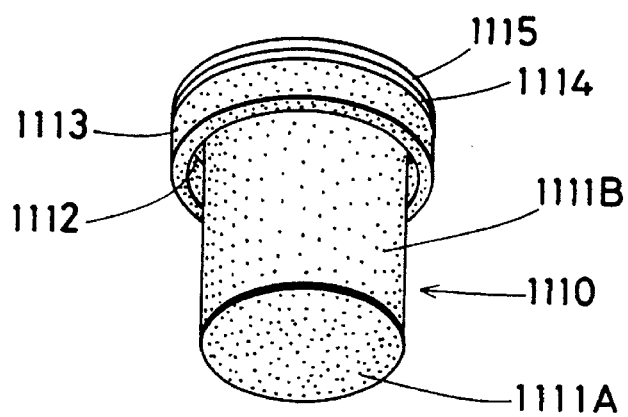

FIG. 21 is a perspective view of a twelfth embodiment of the present invention.

Figure 22:
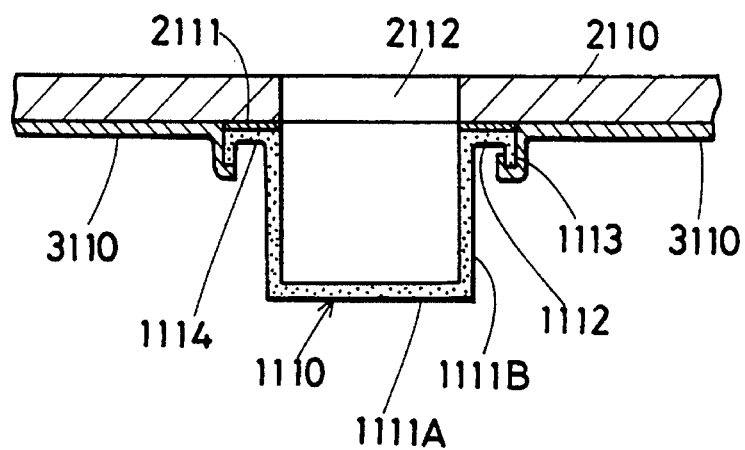

FIG. 22 is a partial side sectional view of the twelfth embodiment of the present invention after coating of the visco-elastic material.

Figure 23:
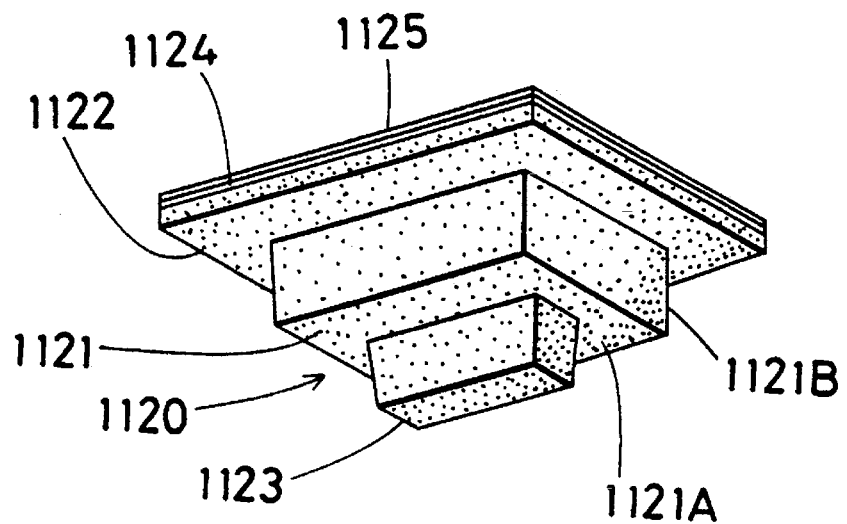

FIG. 23 is a perspective view of a thirteenth embodiment of the present invention.

Figure 24:
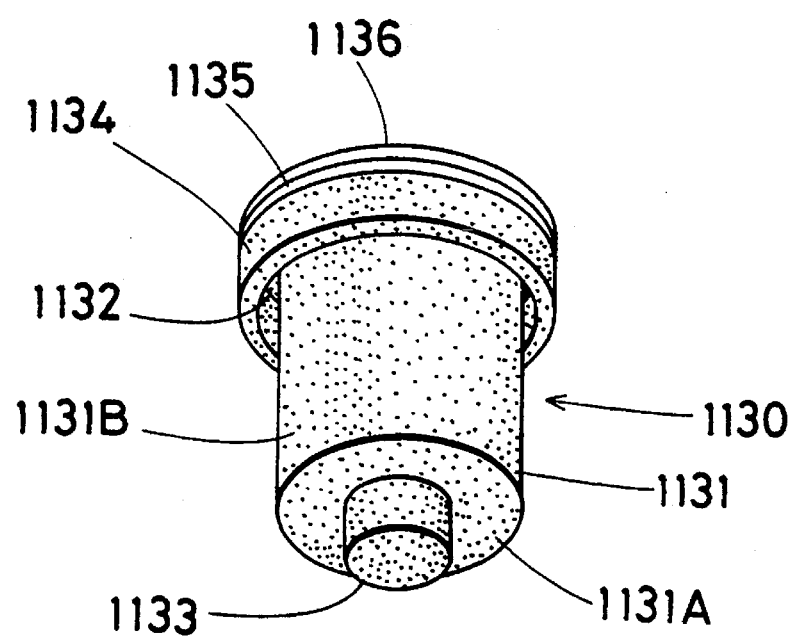

FIG. 24 is a perspective view of a fourteenth embodiment of the present invention.

Figure 25:
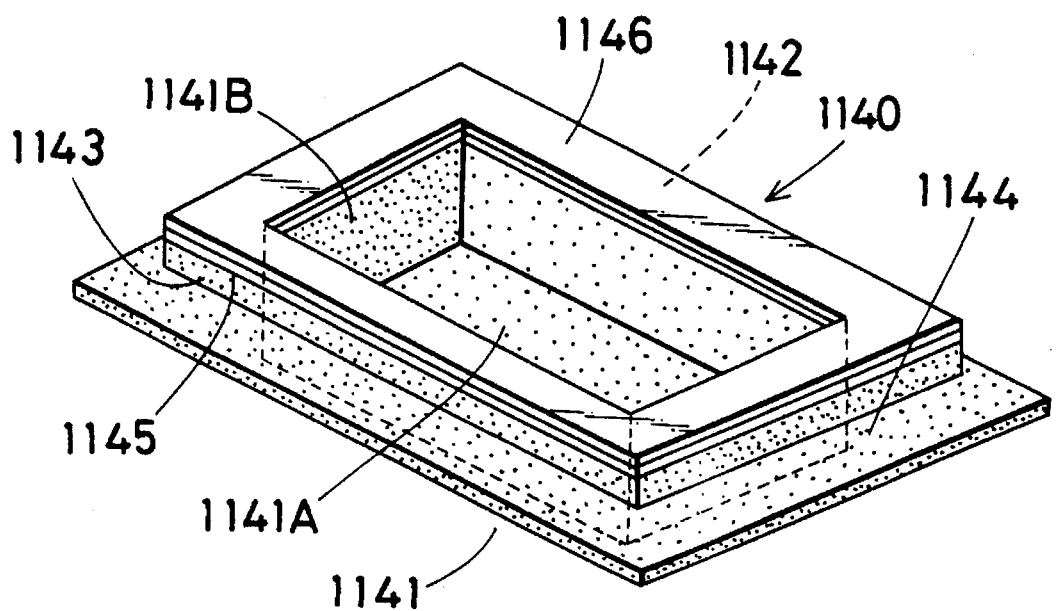

FIG. 25 is a perspective view of a fifteenth embodiment of the present invention.

Figure 26:
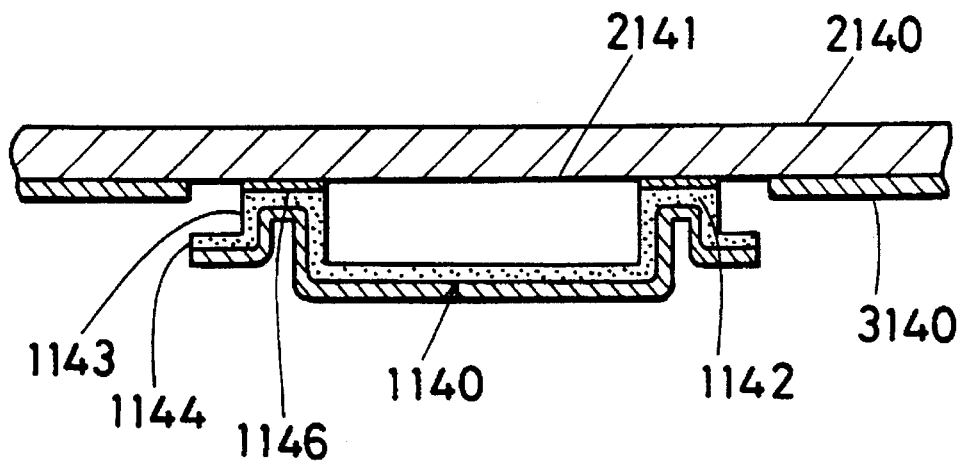

FIG. 26 is a partial side sectional view of the fifteenth embodiment of the present invention after coating of the visco-elastic material.

Figure 27:
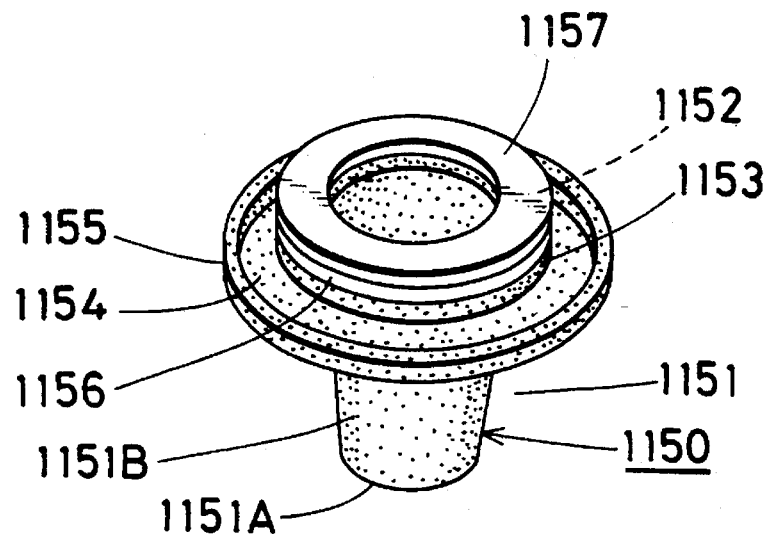

FIG. 27 is a perspective view of a sixteenth embodiment of the present invention.

Figure 28:
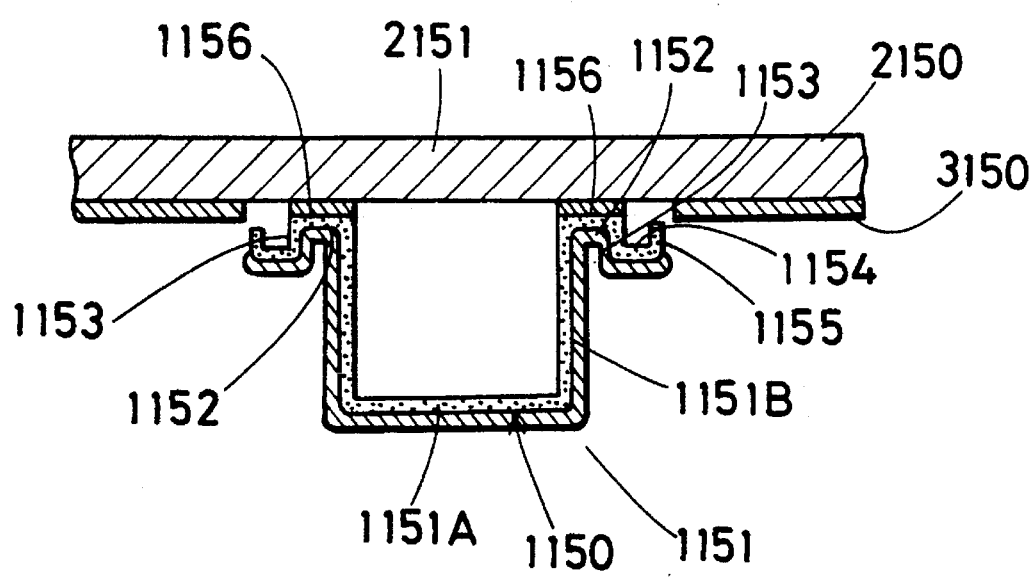

FIG. 28 is a partial side sectional view of the sixteenth embodiment of the present invention after coating of the visco-elastic material.

Figure 29:
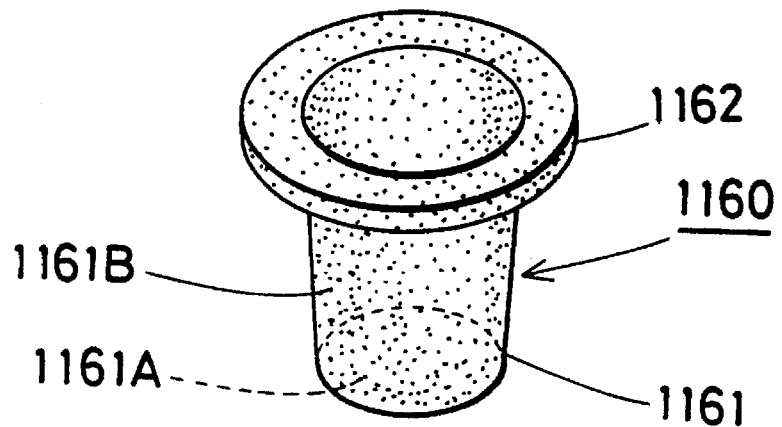

FIG. 29 is a perspective view of the seventeenth embodiment of the present invention.

Figure 30:
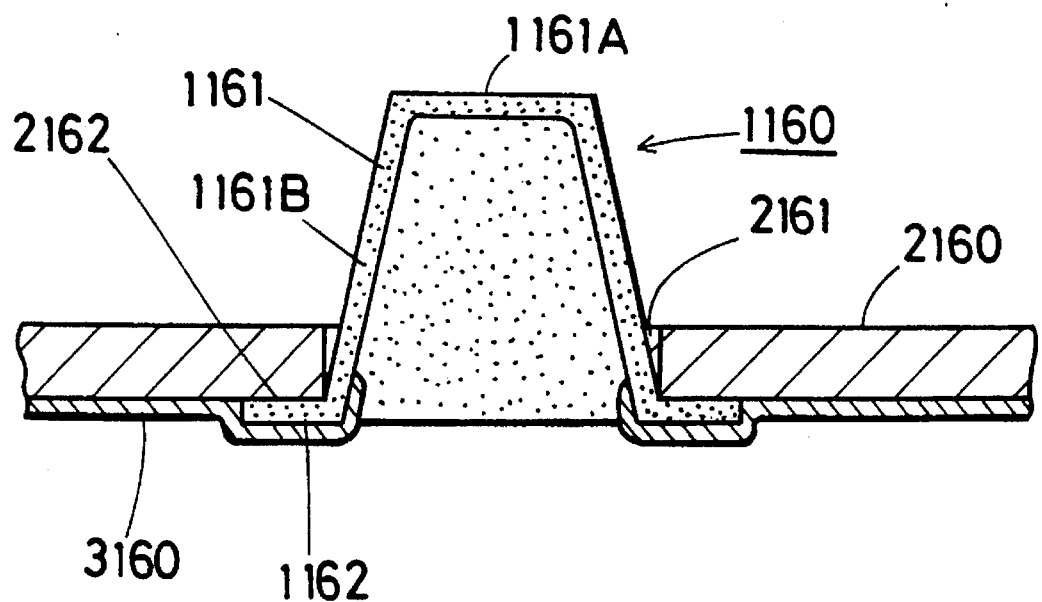

FIG. 30 is a partial side sectional view of the seventeenth embodiment of the present invention.

Figure 31:
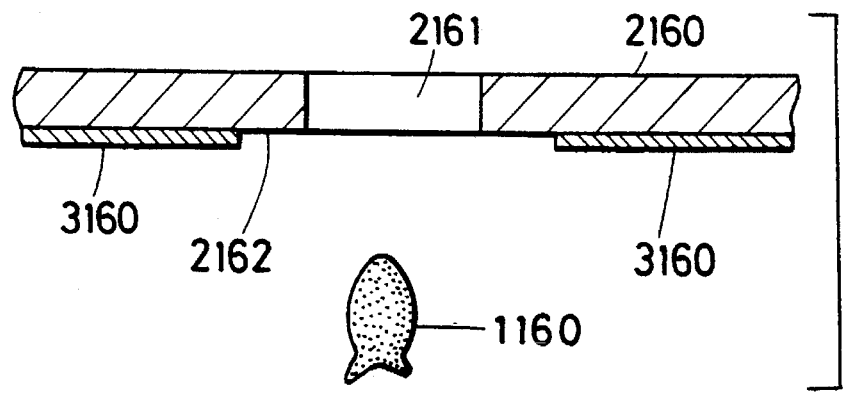

FIG. 31 is a partial side sectional view of the seventeenth embodiment of the present invention in the case of removing the masking member from the metal structure.

Figure 32:
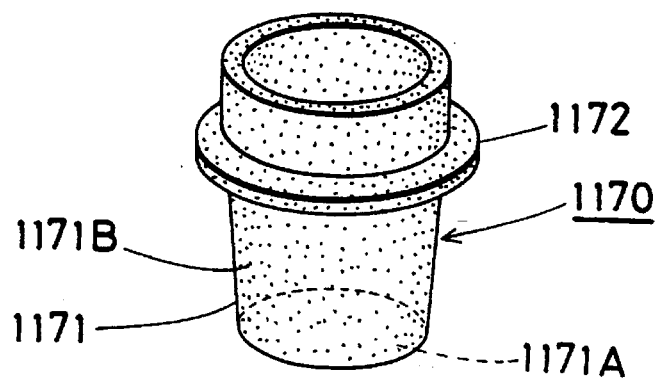

FIG. 32 is a perspective view of the eighteenth embodiment of the present invention.

Figure 33:
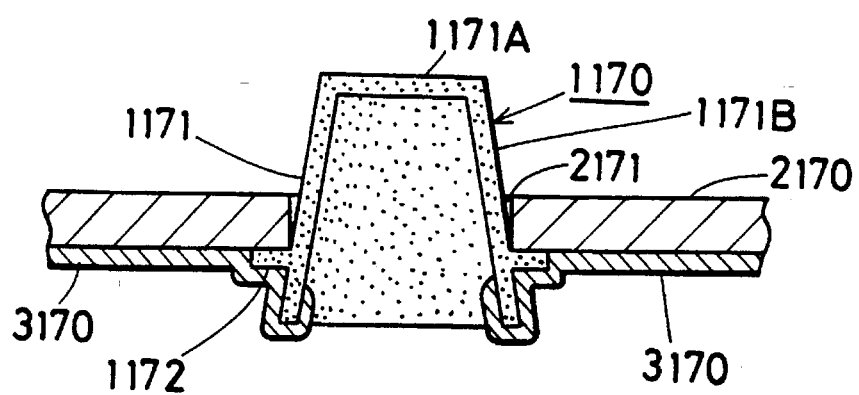

FIG. 33 is a partial side sectional view of the eighteenth embodiment of the present invention after coating of the visco-elastic material.

Figure 34:
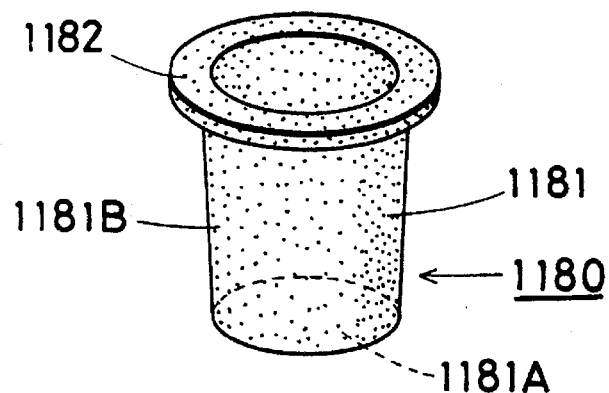

FIG. 34 is a perspective view of the nineteenth embodiment of the present invention.

Figure 35:
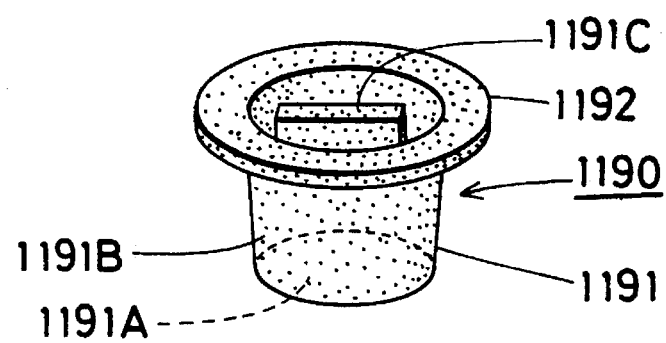

FIG. 35 is a perspective view of the twentieth embodiment of the present invention.

Figure 36:
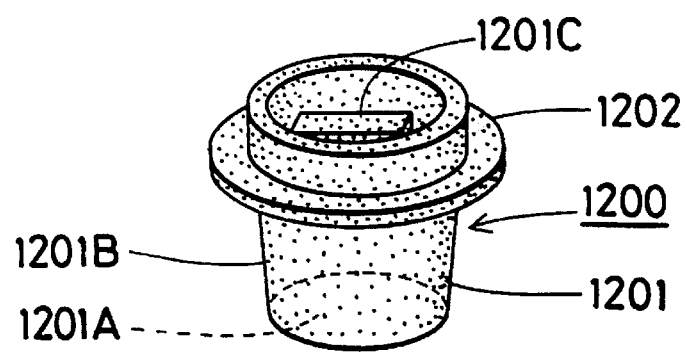

FIG. 36 is a perspective view of the twentyfirst embodiment of the present invention.

Figure 37:
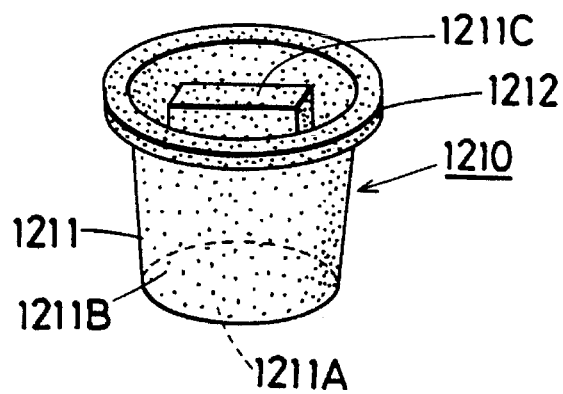

FIG. 37 is a perspective view of the twentysecond embodiment of the present invention.

Figure 38:
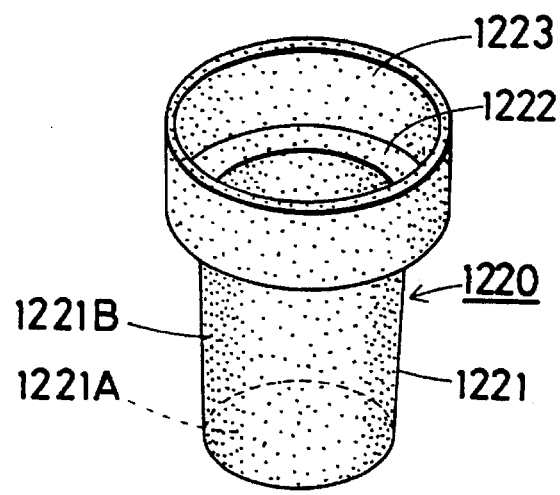

FIG. 38 is a perspective view of the twentythird embodiment of the present invention.

Figure 39:
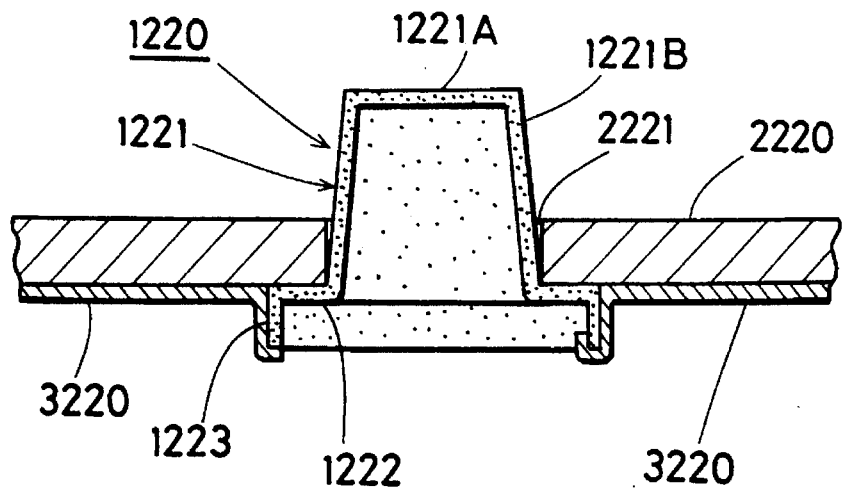

FIG. 39 is a partial side sectional view of the twentythird embodiment of the present invention after coating of the visco-elastic layer.

Figure 40:
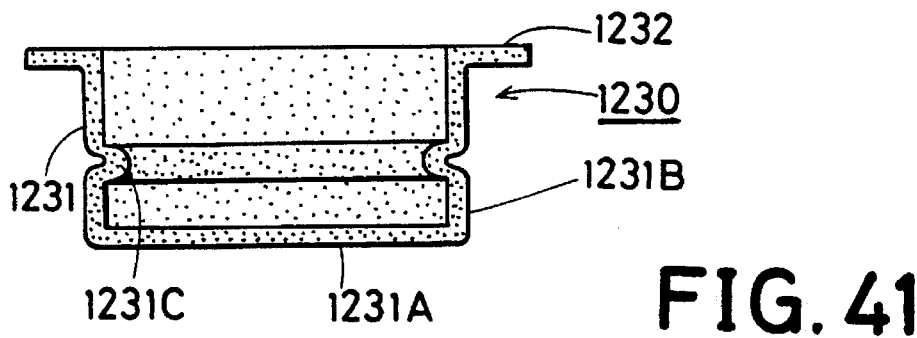

FIG. 40 is a side sectional view of the twentyfourth embodiment of the present invention.

Figure 41:
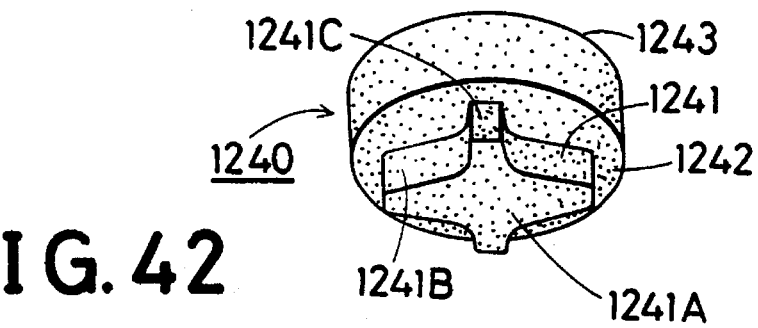

FIG. 41 is a perspective view of the twentyfifth embodiment of the present invention.

Figure 42:
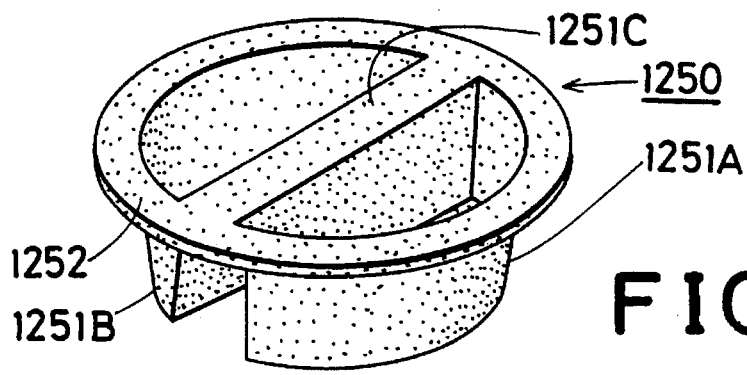

FIG. 42 is a perspective view of the twentysixth embodiment of the present invention.

Figure 43:
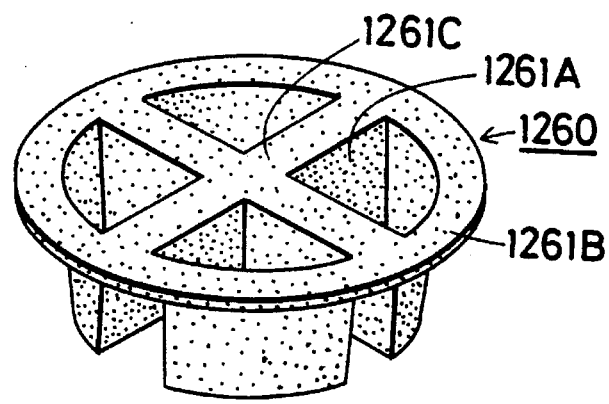

FIG. 43 is a perspective view of the twentyseventh embodiment of the present invention.

Figure 44:
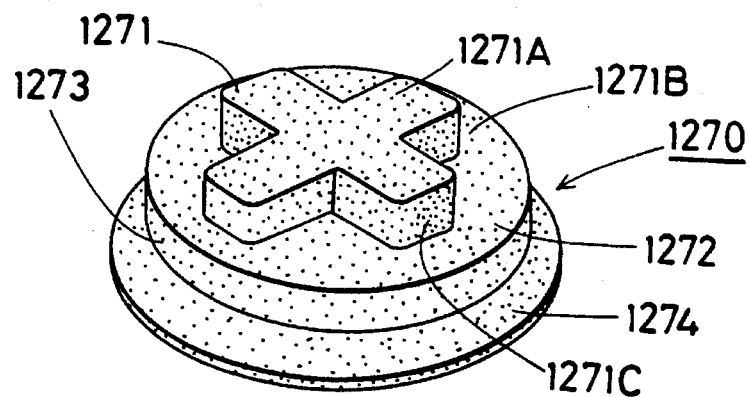

FIG. 44 is a perspective view of the twentyeighth embodiment of the present invention.

Figure 45:
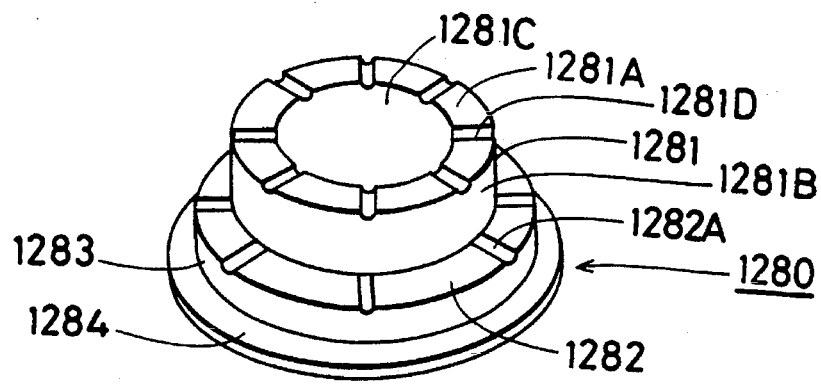

FIG. 45 is a perspective view of the twentyninth embodiment of the present invention.

Figure 46:
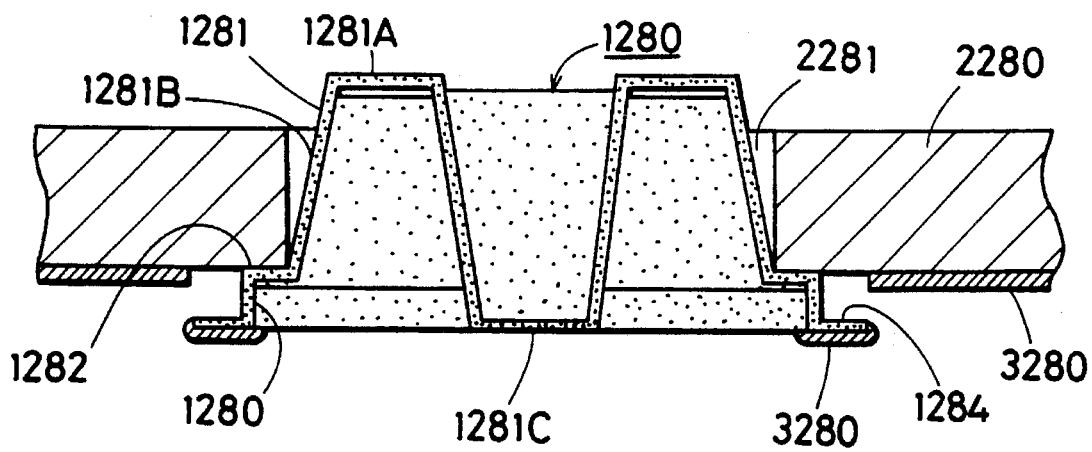

FIG. 46 is a partial side sectional view of the twentyninth embodiment after coating of the visco-elastic material.

Figure 47:
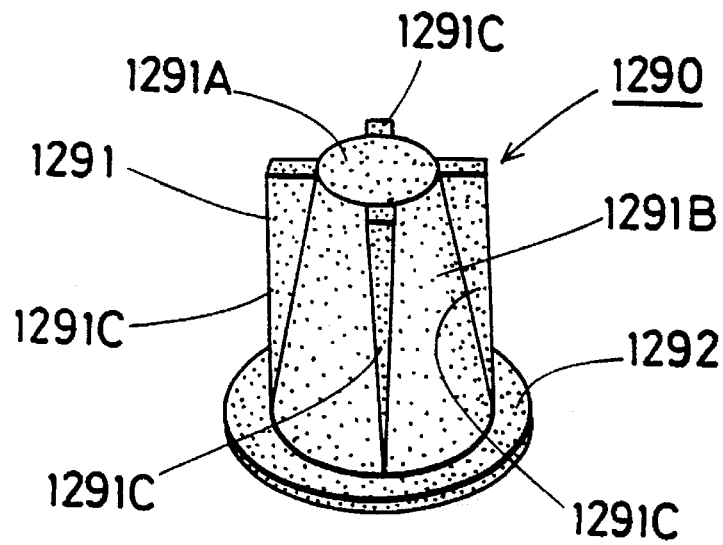

FIG. 47 is a perspective view of the thirtieth embodiment of the present invention.

Figure 48:
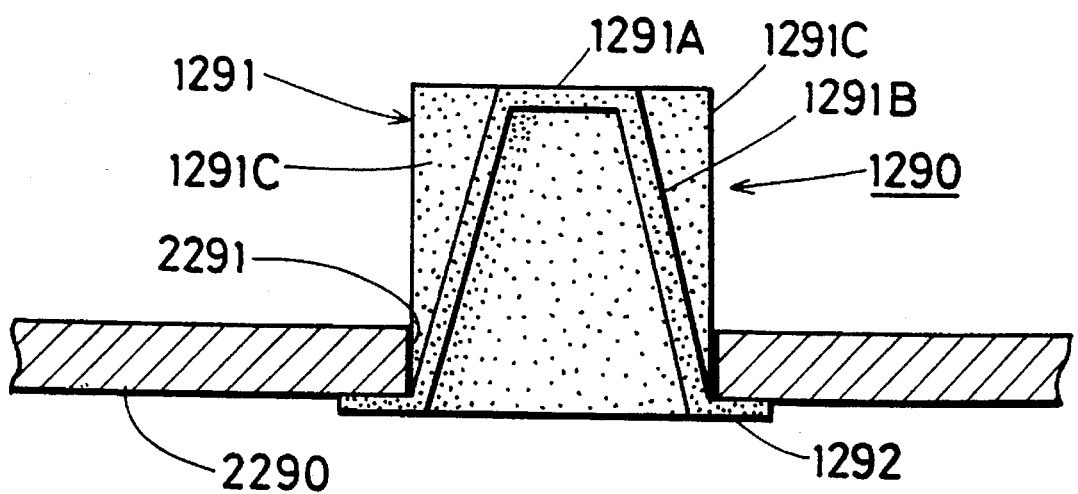

FIG. 48 is a partial side sectional view of the thirtieth embodiment of the present invention.

Figure 49:
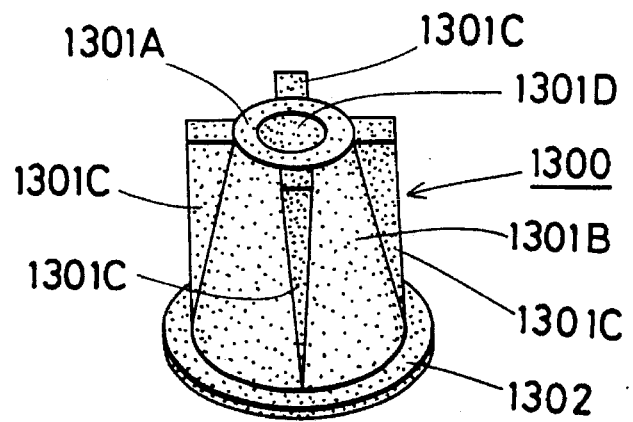

FIG. 49 is a perspective view of the thirtyfirst embodiment of the present invention.

Figure 50:
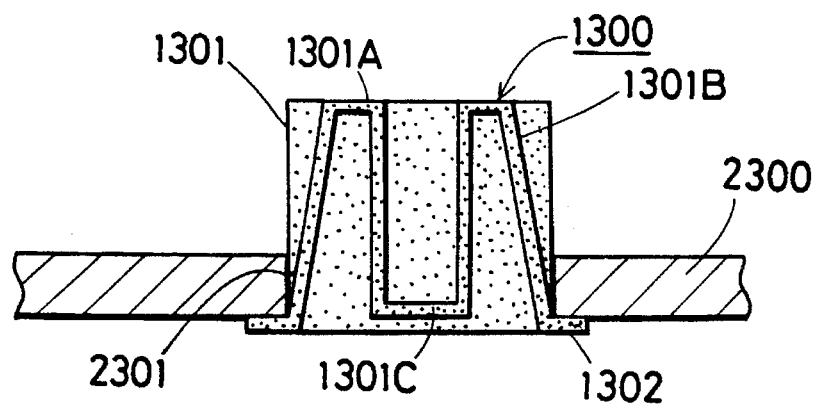

FIG. 50 is a partial side sectional view of the thirtyfirst embodiment of the present invention.

Figure 51:
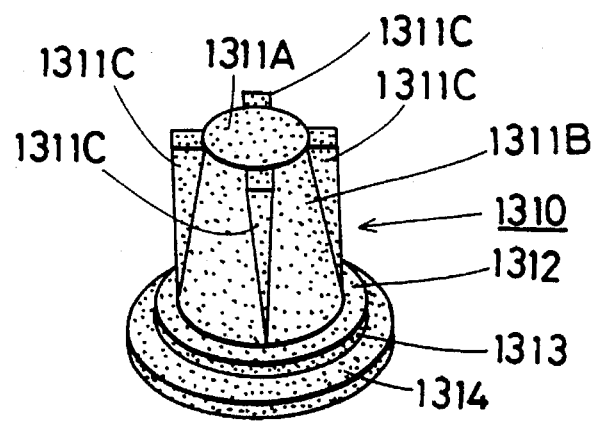

FIG. 51 is a perspective view of the thirtysecond embodiment of the present invention.

Figure 52:
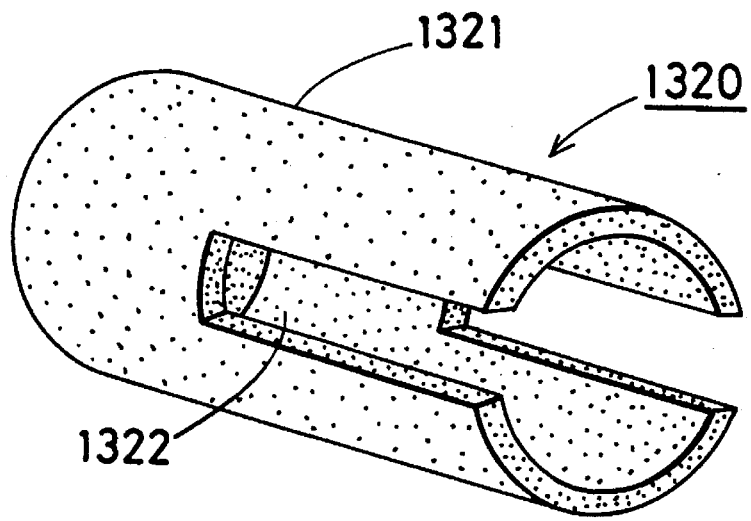

FIG. 52 is a perspective view of the thirtythird embodiment of the present invention.

Figure 53:
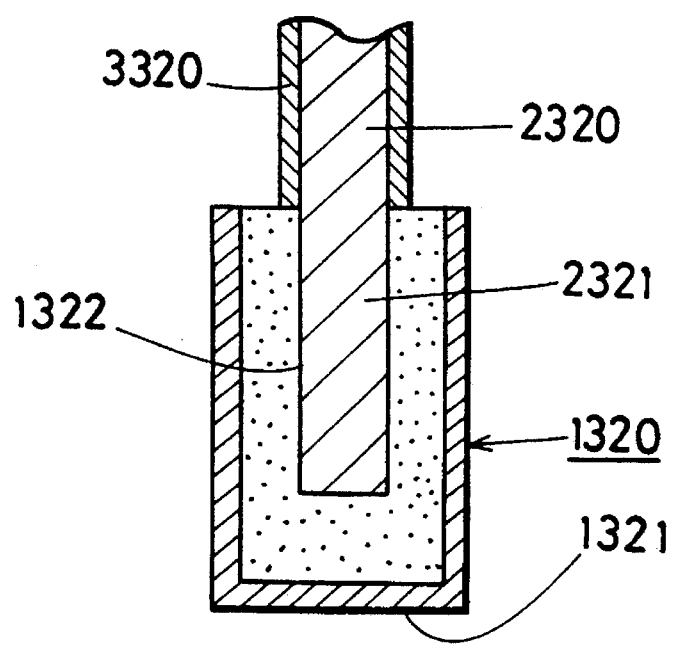

FIG. 53 is a partial side sectional view of the thirtythird embodiment after coating of the visco-elastic material.

Figure 54:
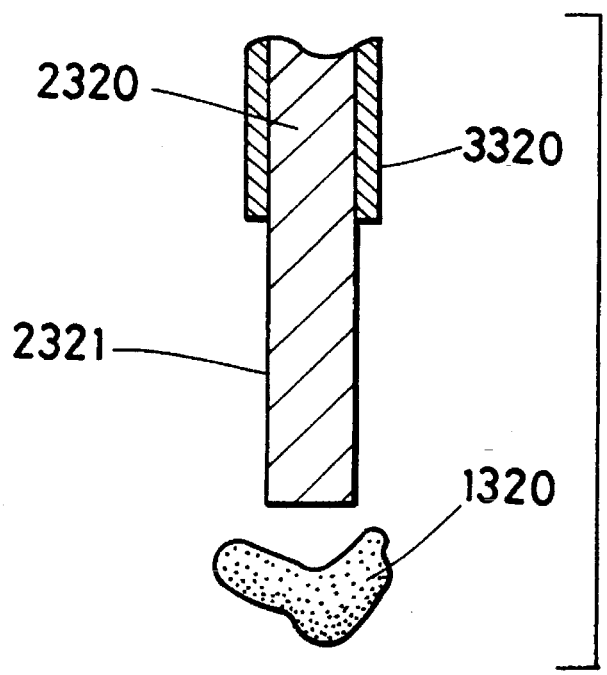

FIG. 54 is a partial sectional view of the thirtythird embodiment in the case of removing the masking member from the metal structure.

Figure 55:
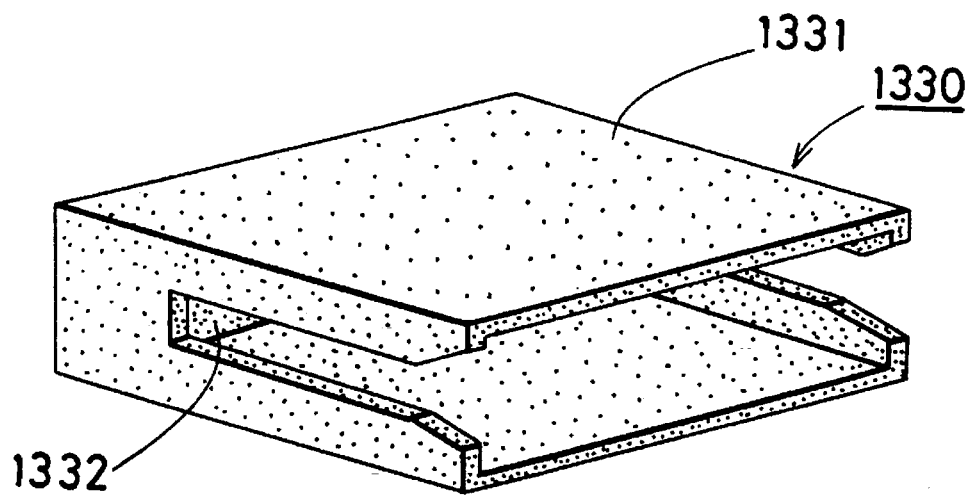

FIG. 55 is a perspective view of the thirtyfourth embodiment of the present invention.

Figure 56:
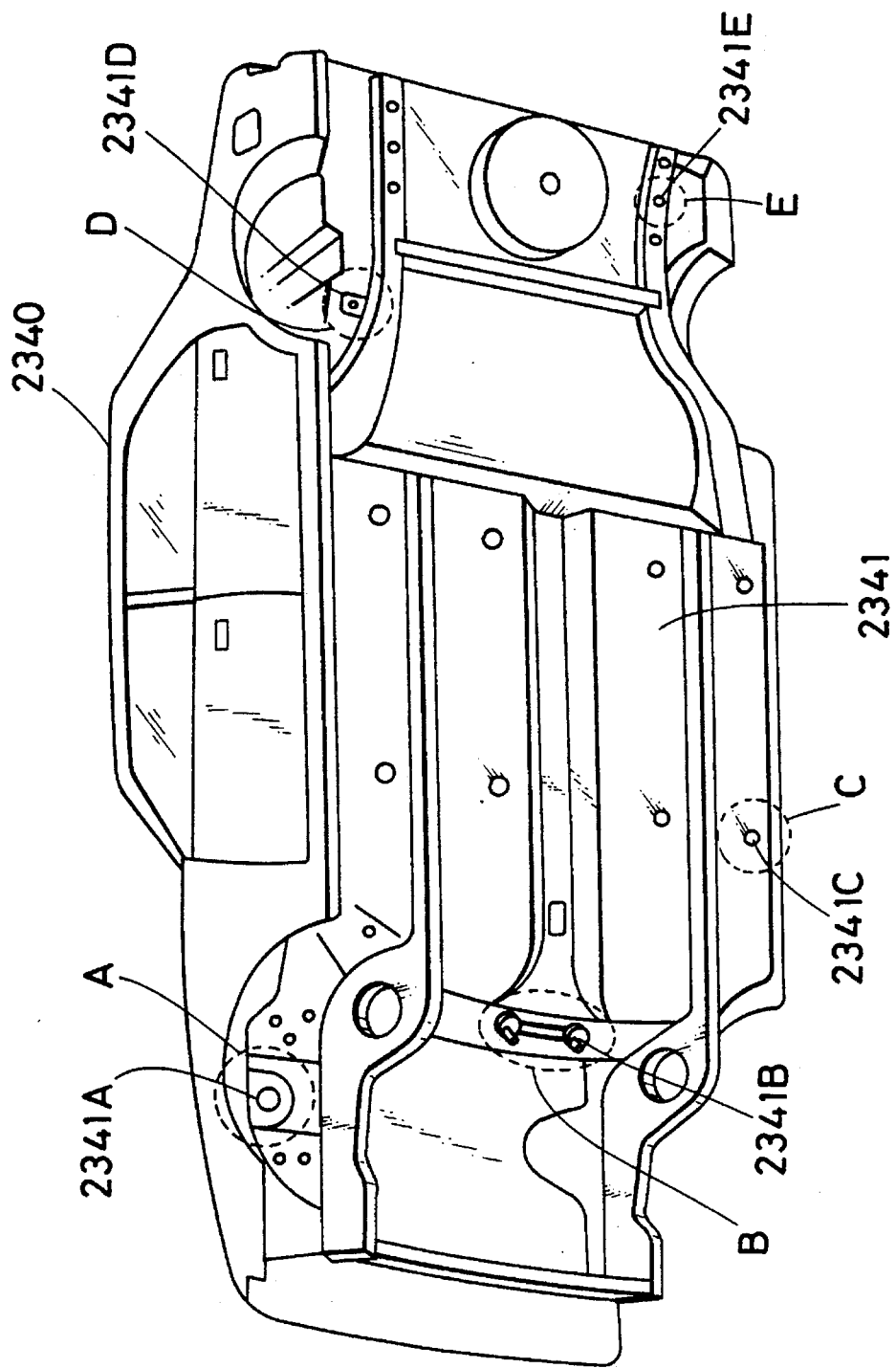

FIG. 56 is a perspective view of a car body of a practical example of the present invention.

Figure 57:
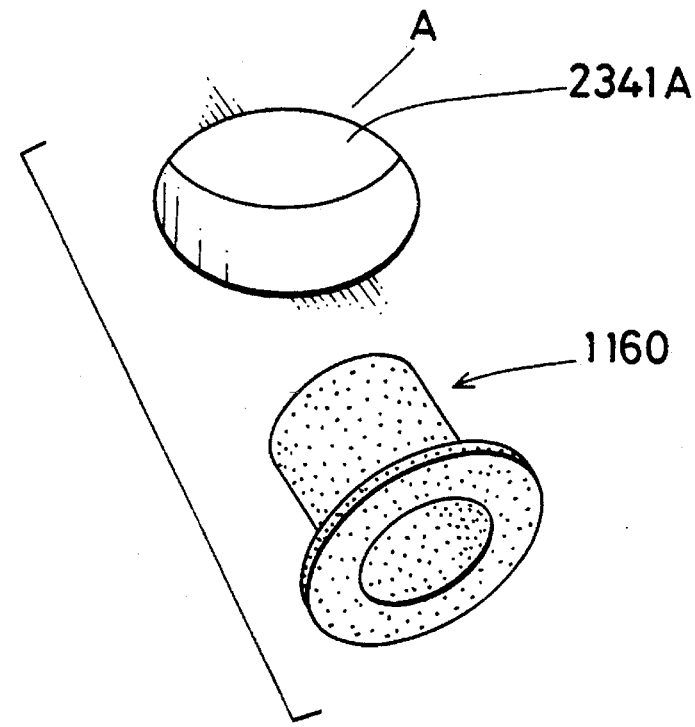

FIG. 57 is a perspective view of Part A to be protected by the masking member of the practical example.

Figure 58:
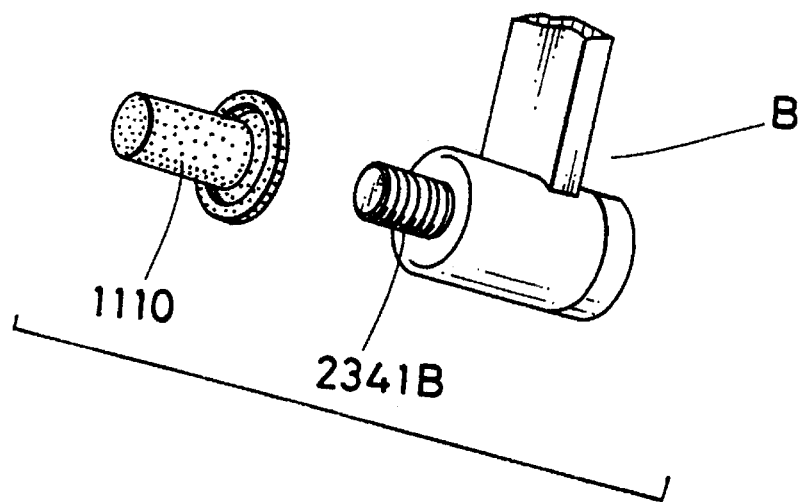

FIG. 58 is a perspective view of Part B to be protected by the masking member of the practical example.

Figure 59:
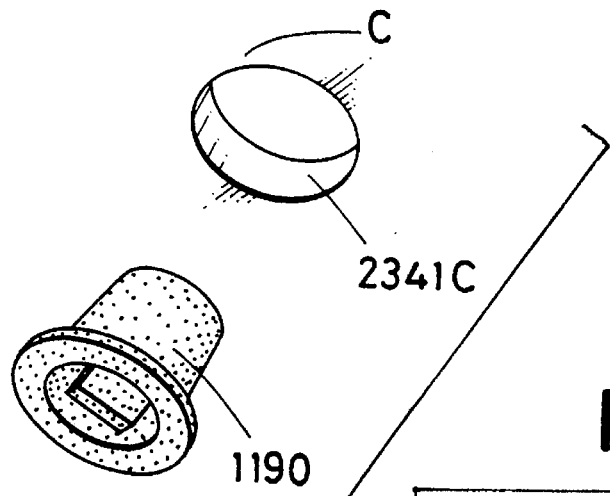

FIG. 59 is a perspective view of Part C to be protected by the masking member of the practical example.

Figure 60:
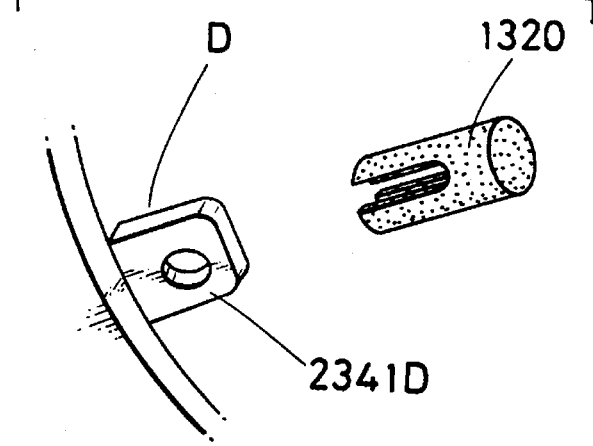

FIG. 60 ms a perspective view of Part D to be protected by the masking member of the practical example.

Figure 61:
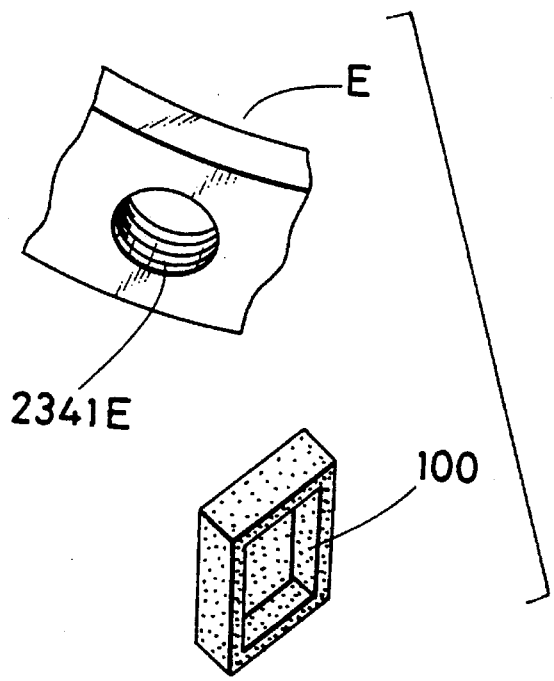

FIG. 61 ms a perspective view of Part E to be protected by the masking member of the practical example.

DETAILED DESCRIPTION

This thin thermoplastic foam walled masking members may be manufactured by the vacuum forming of the thermoplastic foam sheet such as a polystyrene foam sheet, a polyethylene foam sheet, a polypropylene foam sheet and the like. Preferably, the thickness of said thermoplastic foam sheet should be in the range of 0.5 to 5 mm and the expansion ratio of said thermoplastic foam sheet should be in the range of 2 to 20. In case that the thickness of said thermoplastic foam sheet is less than 0.5 mm and the expansion ratio of said thermoplastic foam sheet is more than 20, the mechanical strengths of said masking members may be not enough and it may be feared that said masking members are broken during storage or transportation, or when said masking members are attached or removed to/from said portions or surfaces. On the other hand, in case that the thickness of said thermoplastic foam sheet is more than 5 mm and the expansion ratio of said thermoplastic foam sheet is less than 2, the mechanical strengths of said masking members may be high too much and it may be difficult to stick a hook into said masking members when the hook is used to remove said masking members and further bulk and weight of said masking members may increase, and further it may be difficult to vucuum form smoothly said thermoplastic foam sheet having a thickness more than 5 mm and an expansion ratio less than 2. The thin thermoplastic foam walled masking member may be also manufactured by the expansion molding of the thermoplastic expandable beads such as a polystyrene expandable beads, a polyethylene expandable beads, a polypropylene expandable beads and the like. Preferably, the thickness of said thermoplastic foam walls of said masking members should be in the range of 1 to 5 mm and the expansion ratio of said thermoplastic foam walls should be in the range of 2 to 15.

In case that the thickness of said thermoplastic foam walls is less than 1 , it may be difficult to manufacture said masking member by the expansion molding. On the other hand, in the case that the thickness of said thermoplastic foam walls is more than 5 mm, bulk and weight of said masking members may increase. Further in case that the expansion ratio of said thermoplastic foam walls is less than 2, it may be difficult to stick a hook into said masking members when the hook is used to remove said masking members and further weight of said masking members may increase. On the other hand, in case that the expansion ratio of said thermoplastic foam walls is more than 15, it may be difficult to manufacture said masking members by the expansion molding. The vacuum forming is very suitable for the mass production of said masking members since said masking members can be manufactured continuously by the vacuum forming and on the other hand, the expansion molding is very suitable to manufacture said masking members whose walls have a uniform thickness. Since said masking members of the present invention have small bulk and small weight, the thermoplastic material can be saved and the used scrap masking members may be easily treated by such as burning up.

[Masking member A]

Masking member A is used to protect the even surfaces of the metal structure.

Figure 1:
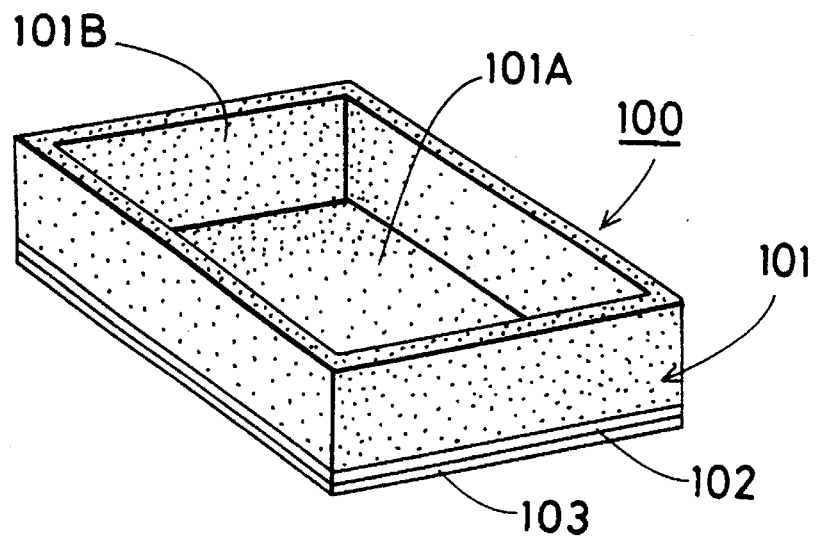
FIG. 1 is a perspective view of a first embodiment of the present invention.
Figure 2:
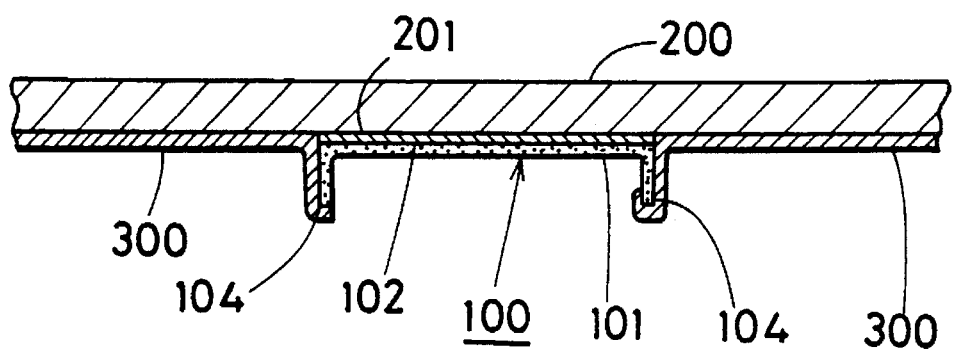
FIG. 2 is a partial side sectional view of the first embodiment of the present invention after coating of the visco-elastic material.
Figure 3:
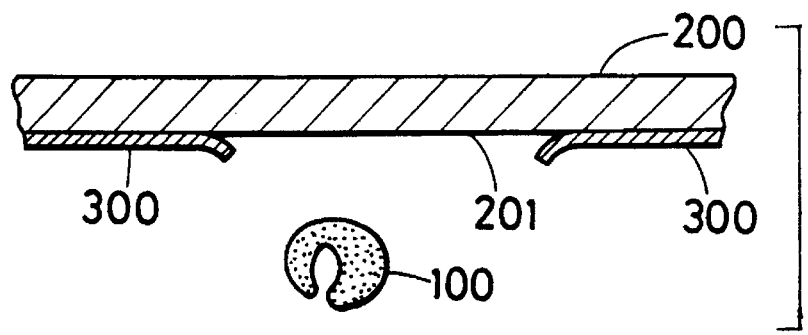

FIG. 1 to FIG. 3 relate to a first embodiment of the present invention. Referring now to FIG. 1 to FIG. 3, a masking member (100) comprises a body (101) having a vessel form consisting of a rectangular bottom (101A) and perpendicular walls (101B) which extend upwards from the perimeter of said bottom (101A), with said body (101) manufactured by vacuum forming of a thermoplastic foam sheet. The thickness of said thermoplastic foam sheet is preferably in the range of 0.5 to 5 mm and the expansion ratio of said thermoplastic foam sheet is preferably in the range of 2 to 20. An adhesive layer (102) such as the pressure sensitive adhesive layer is formed on the under surface of said body (101) and said adhesive layer (102) is covered with a release sheet (103) such as a polyethylene film, a polypropylene film, a release paper and the like to prevent sticking to another article, the hands of workers and the like when the masking members are handled, one placed upon another, transported, and the like.

When said masking member (100) is used, said release sheet (103) is removed from said adhesive layer (102) and said masking member (100) is then attached to an even part (201) of the surface of a metal structure (200) such as the underside of the floor of cars by said adhesive layer (102) thereof, which is necessary to be protected from a coating of visco-elastic material. After said masking member (100) is attached to said part (201), a liquid form of a visco-elastic material is coated on the surface of said metal structure (200) by such as spraying, dipping and the like to form a visco-elastic layer (300) as shown in FIG. 2. Said part (201) of said surface of said metal structure (200) is not subjected to said coating since said part (201) is covered with said masking member (100) and said visco-elastic layer (300) may be cut by an edge (104) of the body (101) of said masking member (100). Said part (201) may have hole(s) and in this case, said hole(s) is(are) also not subjected to said coating. After said coated metal structure (200) is heated to dry and/or cure if desired and in cases where the heating temperature is adequately higher than the softening point of the thermoplastic foam sheet of said body (101) of said masking member (100), said masking member (100) will firstly expand and then shrink by said heating and come off by itself from said part (201) of said surface of said metal structure (200) as shown in FIG. 3. As said masking member (100) comprises a body having a vessel form, the volume of said shrunk masking member (100) may be much smaller than the apparent volume of the unshrunk masking member (100) and further, as above described, said visco-elastic layer (300) may be cut by an edge (104) of the body (101) of said masking member (100), the removing of said masking member (100) from said masking member (100) from said part (201) of said metal structure (200) may be very smooth without obstruction of said visco-elastic layer (300). Said masking member (100) may also be removed by a hook and, in this case, said masking member (100) may be easily removed without obstruction of said visco-elastic layer (300).

FIG. 4 relates to a second embodiment of the present invention. In this embodiment, a masking member (110) comprises a body (111) having a vessel form consisting of a circular bottom (111A) and a perpendicular wall (111B) which extends upwards from the circumference of said bottom (111A), with said body (111) manufactured by the expansion molding of the thermoplastic expandable beads. The thickness of said thermoplastic foam walls of said masking member (110) is preferably in the range of 1 to 5 mm and the expansion ratio of said thermoplastic foam walls is preferably in the range of 2 to 15. An adhesive layer (112) is formed on the under surface of said body (111) and said adhesive layer (112) is covered with a release sheet (113) the same as the first embodiment of the present invention. Further, the body of said masking member of the present invention should have a suitable form according to the part to be protected from a surface treatment.

FIG. 5 to FIG. 7 relate to a third embodiment of the present invention. Referring now to FIG. 5 to FIG. 7, a masking member (120) comprises a body (121) having a vessel form consisting of a rectangular bottom (121A) and perpendicular walls (121B) which extend upwards from the perimeter of said bottom (121A), and a flange (122) which is extended from the upper edges of said walls (121B), with said body (121) manufactured by vacuum forming of a thermoplastic foam sheet the same as the first embodiment of the present invention. An adhesive layer (123) is formed on the under surface of said body (121) and said adhesive layer (123) is covered with a release sheet (124) the same as the first and second embodiments of the present invention.

When said masking member (120) is used, said release sheet (124) is removed from said adhesive layer (123) and said masking member (120) is then attached to a even part (221) of the surface of a metal structure (220) which is necessary to be protected from a surface treatment. After said masking member (120) is attached to said part (221), said visco-elastic material is coated on said surface of said metal structure (220) to form a visco-elastic layer (320) as shown in FIG. 6. In this embodiment, said visco-elastic layer (320) may be more completely cut by said flange (122) of said masking member (120) than in the cases of the first and second embodiments of the present invention and, as the result, said masking member (120) may be more smoothly removed from said part (221) of said surface of said metal structure (220).

A number of masking member (120) of this embodiment may advantageously be produced by vacuum forming from a sheet of a thermoplastic foam such as a polystyrene paper (polystyrene foam sheet) and the like as shown in FIG. 7. Referring to FIG. 7, a number of bodies (121) of masking member (120) are formed arranged in rows and lines, and each body (121) is connected to the other body (121) by the flange (122). Cutting lines (125) or grooves are formed between said flange (122) and another said flange (122) and when said masking member (120) is used, said masking member (120) is broken along said cutting lines (125) or grooves by hand. Said cutting lines (125) or grooves may be formed simultaneously with vacuum forming or after vacuum forming.

FIG. 8 relates to a fourth embodiment of the present invention. In this embodiment a masking member (130) comprises a body (131) having a vessel form consisting of a rectangular bottom (131A) and perpendicular walls (131B) which extend upwards from the perimeter of said bottom (131A), a flange (132) which is extended from the upper edges of said walls (131B), and perpendicular walls (133) which extend upwards from the perimeter of said flange (132), with said body (131) manufactured by vacuum forming of a thermoplastic foam sheet the same as the first embodiment of the present invention. An adhesive layer (134) is formed on the under surface of said body (131) and said adhesive layer (134) is covered with a release sheet (135) the same as the first, second, and third embodiments of the present invention. A visco-elastic layer may be more completely cut by said perpendicular walls (133) of said flange (132).

FIG. 9 relates to a fifth embodiment of the present invention. In this embodiment, a masking member (140) comprises a body (141) having a vessel form consisting of a circular bottom (141A) and a perpendicular wall (141B) which extends upwards from the circumference of said bottom (141A), a flange (142) which is extended from the upper edges of said wall (141B), and perpendicular wall (143) which extends downwards from the circumference of said flange (142), with said body (141) manufactured by the expansion molding of the expandable beads the same as the second embodiment of the present invention. An adhesive layer (144) is formed on the under surface of said body (141)

and said adhesive layer (144) is covered with a release sheet (145) the same as the first, second, third, and fourth embodiments of the present invention.

FIG. 10 and FIG. 11 relate to a sixth embodiment of the present invention. In this embodiment, a masking member (150) comprises a body (151) having a vessel form consisting of a rectangular bottom (151A) from which a grip (152) is risen and perpendicular walls (151B) which extend upwards from the perimeter of said bottom (151A), with said body (151) manufactured by vacuum forming of a thermoplastic foam sheet the same as the first embodiment of the present invention. An adhesive layer (153) is formed on the under surface of said body (151) and said adhesive layer (153) is covered with a release sheet (154) the same as the first, second, third, fourth and fifth embodiments of the present invention. The masking member (150) of this embodiment is easily handled by holding said grip (152) of said masking member (150) when said masking member (150) is attached to an even part of the surface of a metal structure which is to be protected from a coating of the visco-elastic material and further, said masking member is easily removed by piercing said grip (152) of said masking member (150) with a hook.

FIG. 12 relates to a seventh embodiment of the present invention. In this embodiment, a masking member (160) comprises a body (161) having a vessel form consisting of a circular bottom (161A) from which a grip (162) is risen and perpendicular wall which extend upwards from the circumference of said bottom (161A), with said body (161) manufactured by the expansion molding of the expandable beads the same as the second embodiment of the present invention. An adhesive layer (163) is formed on the under surface of said body (161) and said adhesive layer (163) is covered with a release sheet (164) the same as the first, second, third, fourth, fifth, and sixth embodiments of the present invention.

FIG. 13 relates to an eighth embodiment of the present invention. In this embodiment, a masking member (170) comprises a body (171) having a vessel form consisting of a rectangular bottom (171A) from which a grip (173) is risen and perpendicular walls (171B) which extend upwards from the perimeter of said bottom (171A), a flange (172) which is extended from the upper edges of said walls (171B), with said body (171) manufactured by vacuum forming of a thermoplastic foam sheet the same as the first embodiment of the present invention. An adhesive layer (174) is formed on the under surface of said body (171) and said adhesive layer (174) is covered with a release sheet (175) the same as the first, second, third, fourth, fifth, sixth and seventh embodiments of the present invention.

FIG. 14 relates to a ninth embodiment of the present invention. In this embodiment, a masking member (180) comprises a body (181) having a vessel form consisting of a rectangular bottom from which a grip (184) is risen and perpendicular walls (181B) which extend upwards from the perimeter of said bottom (181A), a flange (182) which is extended from the upper edges of said walls (181B), and perpendicular walls (183) which extend upwards from the perimeter of said flange (182), with said body (181) manufactured by vacuum forming of a thermoplastic foam sheet the same as the first embodiment of the present invention. An adhesive layer (185) is formed on the under surface of said body (181) and said adhesive layer (185) is covered with a release sheet (186) the same as the first, second, third, fourth, fifth, sixth, seventh and eighth embodiments of the present invention.

FIG. 15 relates to a tenth embodiment of the present invention. In this embodiment, a masking member (190) comprises a body (191) having a vessel form consisting of a rectangular bottom (191A) from which a grip is risen and perpendicular walls (191B) which extend upwards from the perimeter of said bottom (191A), a flange (192) which is extended from the upper edges of said walls (191B), and perpendicular walls (193) which extend downwards from the perimeter of said flange (192), with said body (191) manufactured by vacuum forming of a thermoplastic foam sheet the same as the first embodiment of the present invention. An adhesive layer (195) is formed on the under surface of said body (191) and said adhesive layer (195) is covered with a release sheet (196) the same as the first, second, third, fourth, fifth, sixth, seventh, eighth and ninth embodiments of the present invention.

[Masking member B]

Masking member B is used to protect the even surfaces or the protruding parts of the metal structure.

FIG. 16 to FIG. 19 relate to a eleventh embodiment of the present invention. Referring now to FIG. 16 to FIG. 19, a masking member (1100) comprises a body (1101) having a vessel form consisting of a square bottom (1101A), perpendicular walls (1101B) which extend upwards from the perimeter of said bottom (1101A), a flange (1102) which is extended from the upper edges of said walls (1101B), and an adhesive layer (1103) formed on the surface of said flange (1102), with said masking member (1100) manufactured by vacuum forming of a thermoplastic foam sheet the same as the first embodiment of the present invention. Said adhesive layer (1103) is covered with a release sheet (1104).

Said masking member (1100) may advantageously be produced by vacuum forming from a thermoplastic foam sheet such as a polystyrene paper (polystyrene foam sheet) and the like as shown in FIG. 17. Referring to FIG. 17, a number of masking members (1100) are formed and arranged in rows and lines, and each masking member (1100) is connected to the other masking member (1100) by the flange (1102). Cutting lines (1105) or grooves are formed between said flange (1102) and another said flange (1102) and when said masking member (1100) is used, said masking member (1100) is broken along said cutting lines (1105) or grooves by hand. Said cutting lines (1105) or grooves may be formed on the surface or (and) the under surface of said flange (1102). Referring to FIG. 18, when said masking member (1100) is used, said release sheet (1104) is removed from said adhesive layer (1103) and said masking member (1100) is then attached to an even part (2101) of the surface of a metal structure (2100) by said adhesive layer (1103) thereof. After said masking member (1100) is attached to said part (2101), said coating is effected on the surface of said metal structure (2100) to form a visco-elastic layer (3100). Said part (2101) of said surface of said metal structure (2100) is not subjected to said coating since said part (2101) is covered with said masking member (1100). After said coating, said coated metal structure (2100) is heated to dry and/or cure if desired and in cases where the heating temperature is adequately higher than the softening point of the thermoplastic foam of said body (1101) of said masking member (1100), said masking member (1100) will firstly expand and then shrink by said heating and come off by itself from said part (2101) of said surface of said metal structure (2100) as shown in FIG. 19. Said masking member (1100) is attached by only said adhesive layer (1103) on the surface of said flange (11D2) thereof to said part (2101) of said metal structure (2100), the removing of said masking member (1100) from said part (2101) of said metal structure (2100) may be very smooth without obstruction of said adhesive layer (1103). Said masking member (1100) may also be removed by a hook and, in this case, said masking member (1100) may also be easily removed without obstruction of said adhesive layer (1103).

As shown in FIG. 20, said masking member (1100) is also used to protect a protruding part (2101) of said metal structure (2100) by covering said protruding part (2102) with said masking member (1100).

FIG. 21 and FIG. 22 relate to a twelfth embodiment of the present invention. In this embodiment, a masking member (1110) comprises a body (1111) having a vessel form consisting of a circular bottom (1111A), an inner perpendicular wall (1111B) which extends upwards from the circumference of said bottom (1111A), a flange (1112) which is extended from the upper edge of said wall (1111B), and an outer perpendicular wall (1113) which extends downwards from the perimeter of said flange (1112), and an adhesive layer (1114) formed on the surface of said flange (1112), with said masking member (1110) manufactured by the expansion molding of the expandable beads the same as the second embodiments of the present invention. Said adhesive layer (1114) is covered with a release sheet (1115) the same as the prior embodiments of the present invention.

When said masking member (1110) is used, said release sheet (1115) is removed from said adhesive layer (1114) and said masking member (1110) is then attached to an even part (2111) as shown in FIG. 22, of the surface of a metal structure (2110) by said adhesive layer (1114) thereof, and said part (2111) has a hole (2112). After said masking member (1110) is attached to said part (2111), a coating is effected on the surface of said metal structure (2110) to form a visco-elastic layer (3110). Said part (2111) including said hole (2112) is not subjected to said coating since said part (2111) is covered with said masking member (1110) and said visco-elastic layer (3110) may be cut by said outer perpendicular wall (1113) of said flange (1112) of said masking member (1110). After said coating, said coated metal structure (2110) is heated to dry and/or cure if desired and in cases where the heating temperature is adequately higher than the softening point of the thermoplastic foam of said masking member (1110), said masking member (1110) will firstly expand and then shrink by said heating and come off by itself from said part (2111) of said surface of said metal structure (2110). Since said visco-elastic layer (3110) may be cut by said outer perpendicular wall (1113) of said flange (1112) of said masking member (1110) as shown in FIG. 22, and said masking member (1110) is also attached by only said adhesive layer (1114) on the surface of said flange (1112) thereof to said part (2111) of said metal structure (2110) the same as the eleventh embodiment of the present invention, the removing of said masking member (1110) from said part (2111) of said metal structure (2110) may be very smooth without obstruction of said visco-elastic layer (3110) and said adhesive layer (1114) of said masking member (1110).

FIG. 23 relates to a thirteenth embodiment of the present invention. In this embodiment, a masking member (1120) comprises a body (1121) having a vessel form consisting of a rectangular bottom (1121A) from which a grip (1123) is risen, perpendicular walls (1121B) which extend upwards from the perimeter of said bottom (1121A), a flange (1122) which is extended from the upper edges of said walls (1121B), and an adhesive layer (1124) formed on the surface of said flange (1122), with said masking member (1120) manufactured by vacuum forming of a thermoplastic foam sheet the same as the first embodiment of the present invention, and said adhesive layer (1124) is covered with a release sheet (1125) the same as the prior embodiments of the present invention. The masking member (1120) of this embodiment is easily handled by holding said grip (1123) of said masking member (1120) when said masking member (1120) is attached to a part of the surface of a metal structure which is to be protected from a coating and further, said masking member is easily removed by piercing said grip (1123) of said masking member (1120) with a hook.

FIG. 24 relates to a fourteenth embodiment of the present invention. In this embodiment, a masking member (1130) comprises a body (1131) having a vessel form consisting of a circular bottom (1131A), from which a grip (1333) is risen, an inner perpendicular wall (1131B) which extends upwards from the circumference of said bottom (1131A), a flange (1132) which is extended from the upper edge of said wall (1131B), an outer perpendicular wall (1134) which extends downwards from the perimeter of said flange (1132), and an adhesive layer (1135) formed on the surface of said flange (1132) with said masking member (1130) manufactured by the expansion molding of the expandable beads the same as the second embodiment of the present invention, and said adhesive layer (1135) is covered with a release sheet (1136) the same as in the prior embodiments of the present invention.

The masking member (1130) of this embodiment is easily handled by holding said grip (1133) of said masking member (1130) when said masking member (1130) is attached to a part of the surface of a metal structure which is to be protected from a coating and further, said masking member (1130) may be easily removed by piercing said grip (1133) of said masking member (1130) with a hook.

FIG. 25 and FIG. 26 relate to a fifteenth embodiment of the present invention. In this embodiment, a masking member (1140) comprises a body (1141) having a vessel form consisting of a rectangular bottom (1141A), inner perpendicular walls (1141B) which extend upwards from the perimeter of said bottom (1141B), an upper flange (1142) which is extended from the upper edges of said walls (1141B), outer perpendicular walls (1143) which extend downwards from the perimeter of said upper flange (1142), a lower flange (1144) which is extended from the lower edges of said outer walls (1143), and an adhesive layer (1145) formed on the surface of said upper flange (1142) with said masking member (1140) manufactured by vacuum forming of a thermoplastic foam sheet the same as the first embodiment of the present invention, and said adhesive layer (1145) is covered with a release sheet (1146) the same as the prior embodiments of the present invention.

The masking member (1140) may be attached to an even part (2141) of the surface of a metal structure (2140) which is to be protected from a coating, and a visco-elastic layer (3140) may be more completely cut by said lower flange (1144) of said masking member (1140) than in the cases of the twelfth and fourteenth embodiments of the present invention since said lower flange (1144) of said masking member (1140) covers and protects the perimeter of said part (2141) of the surface of said metal structure (2140) from said coating as shown in FIG. 26. Therefore, the removing of said masking member (1140) from said part (2141) may be more smooth than in the cases of the twelfth and fourteenth embodiments of the present invention.

FIG. 27 and FIG. 28 relate to a sixteenth embodiment of the present invention. In this embodiment, a masking member (1150) comprises a body (1151) having a vessel form consisting of circular bottom (1151A), an inner perpendicular wall (1151B) which extends upwards from the circumference of said bottom (1151A), an upper flange (1152) which is extended from the upper edge of said wall (1151B), a middle perpendicular wall (1153) which extends downwards from the circumference of said flange (1152), a lower flange (1154) which is extended from the lower edge of said middle perpendicular wall (1153), an outer perpendicular wall (1155) which extends upwards from the circumference of said flange (1154), and an adhesive layer (1156) formed on the surface of said upper flange (1152) with said masking member (1150) manufactured by the expansion molding of the expandable beads the same as the second embodiment of the present invention, and said adhesive layer (1156) is covered with a release sheet (1157) the same as the prior embodiments of the present invention.

The masking member (1150) may be attached to an even part (2151) in the surface of a metal structure (2150) which is to be protected from a coating, and a visco-elastic layer (3150) may be still more completely cut by said lower flage (1154) and said outer perpendicular wall (1155) than in the case of the fifteenth embodiment of the present invention since the circumference of said part(2151) may be covered with both said lower flange (1154) and said outer perpendicular wall (1155) to protect said circumference of said part (2151) from said coating as shown in FIG. 28. Therefore, the removing of said masking member (1150) from said part (2151) may be more smooth than in the cases of the prior embodiments of the present invention.

[Masking member C]

Masking member C is used to protect the hole of the metal structure.

FIG. 29 to FIG. 31 relate to the seventeenth embodiment of the present invention. Referring now to said figures, a masking member (1160) consists of an inserting part (1161) having a vessel form consisting of a circular bottom (1161A) and a perpendicular wall (1161B) which extends upwards from the circumference of said bottom (1161A), and a flange (1162) which is extended from the upper edge of said wall (1161B), said masking member (1160) manufactured by vacuum forming of a thermoplastic foam sheet the same as the first embodiment of the present invention. Said inserting part (1161) has a taper form decreasing in diameter from the base of said inserting part (1161) to the top of said inserting part (1160).

When said masking member (1160) is used, said masking member (1160) protects the inside of a hole (2161) of a metal structure (2160) by inserting said inserting part (1161) into said hole (2161) as shown in FIG. 30, and said flange (1162) of said masking member (1160) covers the surroundings (2162) of said hole (2161). After which, a coating is effected on the surface of said metal structure (2160) to form a visco-elastic layer (3160) and the inside and surroundings of said hole (2161) are not subjected to said coating. After said coating, said masking member (1160) may be removed from said hole (2161) by hand, hook, and the like. Said masking member (1160) can be also removed from said hole (2161) by heating at a temperature higher than the softening point of said thermoplastic foam of said masking member (1160).

When said masking member (1160) is heated to a temperature higher than the softening point of the thermoplastic foam of said masking member, it may be softened and gases such as air, gas of a blowing agent, and the like in the cells of said thermoplastic foam may firstly expand and so said masking member may also expand and, then, when said gases leave the cells, said masking member (1160) may shrink rapidly and remove itself naturally from said hole (2161) as shown in FIG. 31. After said masking member (1160) is removed from said hole (2161), said visco-elastic layer (3160) has not been formed inside and on said surrounding (2162) of said hole (2161) as shown in FIG. 31. Further, said masking member (1160) can be used for many holes having different diameters since said inserting part (1161) of said masking member (1160) has a taper form as before mentioned.

FIG. 32 and FIG. 33 relate to the eighteenth embodiment of the present invention. In this embodiment, a masking member (1170) consists of an inserting part (1171) having a vessel form consisting of a circular bottom (1171A) and a perpendicular wall (1171B) which extends upwards from the circumference of said bottom (1171A) and a flange (1172) which is extended from the upper part of said wall (1171B). Said inserting part (1171) has a taper form decreasing in diameter from the base of said inserting part (1171) to the top of said inserting part (1171). Said masking member (1170) is manufactured by the expansion molding of the expandable beads the same as the second embodiment of the present invention.

Said masking member (1170) of this embodiment is used as same as the seventeenth embodiment and a visco-elastic layer (3170) may be cut by the upper edge of said inserting part (1171) as shown in FIG. 33, and therefore, said masking member (1170) may be smoothly removed from the hole (2171) of the metal structure (2170) without the obstruction of said visco-elastic layer (3170).

FIG. 34 relates to the nineteenth embodiment of the present invention. In this embodiment, a masking member (1180) consists of an inserting part (1181) having a vessel form consisting of a circular bottom (1181A) and a perpendicular wall (1181B), and a flange (1182) which is extended from the upper edge of said wall (1181B). The width of said flange (1182) is smaller than the width of the flange (1162) of the masking member (1160) of the seventeenth embodiment and said flange (1182) having small width acts as a stopper of the masking member (1180) when said masking member (1180) is inserted into the hole.

FIG. 35 relates to the twentieth embodiment of the present invention. In this embodiment, a masking member (1190) comprises an inserting part (1191) having a vessel form consisting of a circular bottom (1191A) from which a grip (1191C) is risen, and perpendicular wall (1191B) which extends upwards from the circumference of said bottom (1191A), and a flange (1192) which is extended from the upper edge of said wall (1191B). Said inserting part (1191) has a taper form decreasing in diameter from the base of said inserting part (1191) to the top of said inserting part (1191). Said masking member (1190) is manufactured by vacuum forming of a thermoplastic foam sheet the same as the first embodiment of the present invention. The masking member (1190) of this embodiment is easily handled by holding said grip(1191C) when said masking member (1190) is inserted into the hole of the metal structure or removed from the hole.

FIG. 36 relates to the twenty-first embodiment of the present invention. In this embodiment, a masking member (1200) consists of a inserting part (1201) having a vessel form consisting of a circular bottom (1201A) from which a grip (1201C) is risen and a perpendicular wall (1201B) which extends upwards from the circumference of said bottom (1201A) and a flange (1202) which is extended from the upper part of said wall (1201B). Said inserting part (1201) has a taper form decreasing in diameter from the base of said inserting part (1201) to the top of said inserting part (1201). Said masking member (1200) is manufactured by the expansion molding of the expandable beads the same as the second embodiment of the present invention. Said masking member (1200) of this embodiment is easily handled by holding said grip (1201C) when the masking member (1200)

is inserted into the hole of the metal structure or removed from the hole as same as the twentieth embodiment of the present invention. Further, the visco-elastic layer coated on the metal structure may be cut by the upper edge of said inserting part (1201) as same as the eighteenth embodiment so that said masking member (1200) is easily removed from the hole without the obstruction of said visco-elastic layer.

FIG. 37 relates to the twenty-second embodiment of the present invention. In this embodiment, a masking member (1210) comprises an inserting part (1211) having a vessel form consisting of a circular bottom (1211A) from which a grip (1211C) is risen, a perpendicular wall (1211B) which extends upwards from the circumference of said bottom (1211A), and a flange (1212) which is extended from the upper edge of said wall (1211B). Said inserting part (1211) has a taper form decreasing in diameter from base of said inserting part (1211) to the top of said inserting part (1211) and the width of said flange (1212) is smaller than the width of the flange (1192) of the masking member (1190) of the twentieth embodiment and said flange (1212) having small width acts as a stopper of the masking member (1210) when said masking member (1210) is inserted into hole.

FIG. 38 and FIG. 39 relate to the twenty-third embodiment of the present invention. In this embodiment, a masking member (1220) consists of an inserting part (1221) having a vessel form consisting of a circular bottom (1221A) and a perpendicular wall (1221B) which extends upwards from the circumference of said bottom (1221A), and a flange (1222) which is extended from the upper edge of said wall (1221B), and has a perpendicular wall (1223) which extends upwards from the circumference of said flange (1222). Said inserting part (1221) has a taper form decreasing in diameter from the base of said inserting part (1221) to the top of said inserting part (1221). Said masking member (1220) is manufactured by vacuum forming of thermoplastic foam sheet the same as the first embodiment of the present invention.

Said masking member (1220) of this embodiment is used as same as the seventeenth embodiment, and in this embodiment the visco-elastic layer (3220) may be cut by the edge of said perpendicular wall (1221B) as shown in FIG. 39, so that said masking member (1220) is easily removed from the hole (2221) of the metal structure (2220) without obstruction of said visco-elastic layer (3220).

FIG. 40 relates to the twenty-fourth embodiment of the present invention. In this embodiment, a masking member (1230) consists of an inserting part (1231) having a vessel form consisting of a circular bottom (1231A) and a perpendicular wall (1231B) in the middle part of which a horizontal rib (1231C) is formed, and a flange (1232) which is extended from the upper edge of said wall (1231B).

Said masking member (1230) of this embodiment is used as same as the seventeenth embodiment and said horizontal rib (1231C) reinforces said wall (1231B) of said inserting part (1231) of said masking member (1230) so that said masking member (1230) is firmly inserted into the hole of the metal structure.

FIG. 41 relates to the twenty-fifth embodiment of the present invention. In this embodiment, a masking member (1240) consists of an inserting part (1241) having vessel form consisting of a cross-shaped bottom (1241A) and a perpendicular wall (1241B) which extends upwards from the perimeter of said bottom (1241A'), a flange (1242) which is extended from the upper edge of said wall (1241B), and a perpendicular wall (1243) which extends upwards from the circumference of said flange (1242). Said masking member (1240) is manufactured by vacuum forming of thermoplastic foam sheet the same as the first embodiment of the present invention. In this embodiment, said inserting part (1241) is reinforced by said cross-shaped bottom (1241A) to prevent crushing of said inserting part (1241) of said masking member when said masking member (1240) is inserted into the hole of the metal structure, and further said masking member (1240) is supported in the inner wall of said hole by only partially contacts at the tips (1241C) of said inserting part (1241) so that removing of said masking member (1240) from the hole may be very easy.

FIG. 42 relates to the twenty-sixth embodiment of the present invention. In this embodiment, a masking member (1250) consists of an inserting part (1251) which has a vessel form and is divided into two crescent parts (1251A) and (1251B) by a grip (1251C) which is risen from the bottom of said inserting part (1251), and a flange (1252) which is extended from the upper edge of said inserting part (1 251).

Said masking member (1250) of this embodiment is easily manufactured by vacuum molding the same as the first embodiment of the present invention and easily removed from the hole since said masking member (1250) partially contacts with the inner wall of the hole, since said inserting part (1251) is divided into two crescent parts (1251A) and (1251B) by said grip (1251C).

FIG. 43 relates to the twenty-seventh embodiment of the present invention. In this embodiment, a masking member (1260) consists of an inserting part (1261) which has a vessel form and is divided into four parts (1261A), (1261B), (1261C) and (1261D) by a cross-shaped grip (1261E) which is risen from the bottom of said inserting part (1261), and a flange (1262) which is extended from the upper edge of said inserting part (1261).

Said masking member (1260) of this embodiment is used the same as the twenty-sixth embodiment and easier removed from the hole since the contacting area of said masking member (1260) with the inner wall of the hole is smaller than the case of the twenty-sixth embodiment so that said inserting part (1261) is divided into four parts (1261A), (1261B), (1261C), and (1261D) by said cross-shaped grip (1261E) and the thermoplastic foam sheet is saved in this embodiment comprising the masking member having the cylindrical inserting part.

FIG. 44 relates to the twenty-eighth embodiment of the present invention. In this embodiment, a masking member (1270) consists of an inserting part (1271) having vessel form consisting of a cross-shaped bottom (1271A) and a perpendicular wall (1271B) which extends upwards from the perimeter of said bottom (1271A), a lower flange (1272) which is extended from the upper edge of said wall (1271B), a perpendicular wall (1273) which extends upwards from the circumference of said lower flange (1272), and an upper flange (1274) which is extended from the upper edge of said wall (1273). Said masking member (1270) is manufactured by vacuum forming of thermoplastic foam sheet the same as the first embodiment of the present invention.

In this embodiment, said inserting part (1271) is reinforced by said cross-shaped bottom (1271A) to prevent crushing of said inserting part (1271) of said masking member when said masking member (1270) is inserted into the hole of the article, and further said masking member (1270) is supported in the inner wall of said hole by only partially contacts at the tips (1271C) of said inserting part (1271) so that removing of said masking member (1270) from the hole may be very easy. The film of the surface treatment may be more completely cut by said upper flange (1274) with said lower flange (1272) and said perpendicular wall (1273) than in the case of the twenty-fifth embodiment of the present invention.

FIG. 45 and FIG. 46 relate to the twenty-ninth embodiment of the present invention. In this embodiment, a masking member (1280) consists of an inserting part (1281) having vessel form consisting of a circular bottom (1281A) from which a grip (1281C) is risen and an inner perpendicular wall (1281B) which extends upwards from the circumference of said bottom (1281A), a lower flange (1282) which is extended from the upper part of said wall (1281B), an outer perpendicular wall (1283) which extends upwards from the circumference of said lower flange (1282), and an upper flange (1284) which is extended from the upper part of said wall (1283), and plural radiated ribs (1281D) and (1282A) are respectively formed in said lower flange (1282) and said upper flange (1284). Said inserting part (1281) has a taper form decreasing in diameter from the base to the top of said inserting part (1281). Said masking member (1280) is manufactured by vacuum forming of a thermoplastic foam sheet the same as the first embodiment of the present invention.

As shown in FIG. 46, said masking member (1280) is inserted a hole (2281) of a metal structure (2280) the same as the twentieth embodiment and since a visco-elastic layer (3280) may be cut by said upper flange (1284) of said masking member (1280), the removing of said masking member (1280) from said hole (2281) may be very smooth without obstruction of said visco-elastic layer (3280) and further said ribs (1281D) and (1282A) respectively reinforce said lower and upper flanges (1282) and (1284).

FIG. 47 and FIG. 48 relate to the thirtieth embodiment of the present invention. In this embodiment a masking member (1290) consists of an inserting part (1291) having a vessel form consisting of a circular bottom (1291A) and a perpendicular wall (1291B) which extends upwards from the circumference of said bottom (1291A) and on which plural perpendicular ribs (1291C) are formed, and a flange (1292) which is extended from the upper edge of said wall (1291B). Said inserting part (1291) has a taper form decreasing in diameter from the base to the top of said inserting part (1291). Said masking member is manufactured by the expansion molding of the expandable beads the same as the second embodiment of the present invention. In this embodiment, said perpendicular ribs (1291C) reinforce said perpendicular wall (1291B) to prevent crushing of said inserting part (1291) of said masking member (1290) when said masking member (1290) is inserted into a hole (2291) of a metal structure (2290) as shown in FIG. 48 and said masking member (1290) is firmly held in said hole (2291) since said perpendicular ribs (1290C) of said masking member (1290) tightly contact to the inner wall of said hole.

FIG. 49 and FIG. 50 relate to the thirty-first embodiment of the present invention. In this embodiment, a masking member (1300) consists of an inserting part (1301) having a vessel form consisting of a circular bottom (1301A) from which a grip (130D) is risen and a perpendicular wall (1301B) which extends upwards from the circumference of said bottom (1301A) and on which plural perpendicular ribs (1301C) are formed, and a flange (1302) which is extended from the upper edge of said wall (1301B). Said inserting part (1301) has a taper form decreasing in diameter from the base to the top of said inserting part (1301). Said masking member (1300) is manufactured by the expansion molding of the expandable beads the same as the second embodiment of the present invention. In this embodiment, said perpendicular ribs (1301C) reinforce said perpendicular wall (1301B) to prevent crushing of said inserting part (1301) of said masking member (1300) when said masking member (1300) is inserted into a hole (2301) of a metal structure (2300) as shown in FIG. 50 and said masking member (1300) is firmly held in said hole (2301) since said perpendicular ribs (1301C) of said masking member (1300) tightly contact to the inner wall of said hole (2301). Further, said masking member (1300) of this embodiment is easily handled by holding said grip (1301D) when said masking member (1300) is inserted into said hole (2301).

FIG. 51 relates to the thirty-second embodiment of the present invention. In this embodiment, a masking member (1310) consists of an inserting part (1311) having a vessel form consisting of a circular bottom (1311A) from which a grip (1311D) is risen and a perpendicular wall (1311B) which extends upwards from the circumference of said bottom (1311A) and on which plural perpendicular ribs (1311C) are formed, a lower flange (1312) which is extended from the upper edge of said wall (1311B), a perpendicular wall (1313) which extends upwards from the circumference of said flange (1312), and an upper flange (1314) which is extended from the upper edge of said perpendicular wall (1313). Said inserting part (1311) has a taper form decreasing in diameter from the base of said inserting part (1311) to the top of said inserting part (1311). Said masking member is manufactured by the expansion molding of the expandable beads the same as the second embodiment of the present invention.

In this embodiment, said perpendicular ribs (1311C) reinforce said perpendicular wall (1311B) to prevent crushing of said inserting part (1311) of said masking member (1310) when said masking member (1310) is inserted into the hole (2311) of the metal structure (2310) and said masking member (1310) is firmly held in the hole since said perpendicular ribs (1311C) of said masking member (1310) tightly contact to the inner wall of said hole. Further, said masking member (1310) of this embodiment is easily handled by holding said grip (1311D) when said masking member (1310) is inserted into the hole as same as the thirty-second embodiment and the visco-elastic layer may be more completely cut by said upper flange (1314) with said lower flange (1312) and said perpendicular wall (1313) than in the case of the thirtieth and thirty-first embodiments of the present invention so that said masking member (1310) is more easily removed from the hole without the obstruction of the visco-elastic layer.

[Masking member D]

Masking member d is used to protect the extending part of the metal structure.

FIG. 52 to FIG. 54 relate to the thirty-third embodiment of the present invention. In this embodiment, a masking member (1320) consists of a body (1321) having a cylindrical vessel form, which has a slit (1322) formed from the opening end of said body (1321) with said body (1321) manufactured by vacuum forming of a thermoplastic foam sheet the same as the first embodiment. An extending part (2321) of the metal structure (2320) to be protected is inserted into said slit (1322) of said masking member (1320) and the visco-elastic layer (3320) is not formed on said extending part (2321) since said extending part (2321) is protected by said masking member (1320) as shown in FIG. 53. After coating of the visco-elastic material, said masking member is removed by heating as shown in FIG. 54 or by hook without or before heating.

FIG. 55 relates to the thirty-fourth embodiment of the present invention. In this embodiment, a masking member (1330) consists of a body (1331) having a square vessel form and a slit (1332) which is formed from the opening end of said body (1331) with said body (1331) manufactured by vacuum forming of a thermoplastic foam sheet the same as the first embodiment. Said masking member is used the same as the thirty-third embodiment.

[Application of the present invention to the under side of the car body.]

FIG. 56 to FIG. 61 relate to an applied embodiment in which the present invention is applied to the under side of the car body.

As shown in FIG. 56, the masking members of the present invention are attached to parts A, B, C, D and E of the under side (2341) of a car body (2340). Namely, as shown in FIG. 57, the masking member C, such as said masking member (1160) of FIG. 29 of the seventeenth embodiment may be attached to a hole (2341A) of part A into which a spring axis of a forward wheel is inserted and the circumference of the hole (2341A) is used as a bed for the spring. Therefore, the inside of the hole (2341A) is covered with the inserting part (1161) of the masking member (1160) and the circumference of the hole (2341) is covered with the flange (1162) of the masking member (1160) to protect these from the coating of visco-elastic material.

As shown in FIG. 58, the masking member B, such as said masking member (1110) of the twelfth embodiment is attached to a bolt (2341B) of part B which is used to attach a part to the underside (2341) of the car body (2340).

As shown in FIG. 59, the masking member (1190) of the twentieth embodiment is inserted into a drainage hole (2341C), as shown in FIG. 60, the masking member D, such as the masking member (1320) of the thirty-third embodiment is attached to a bracket (2341D) of part D which is used to attach a part to the under side (2341) of the car body (2340), and as shown in FIG. 61, the masking member (100) of the first embodiment is attached to a screw hole (2341E) which is used to attach a part to the under side (2341) of the car body (2340). Thus, said hole (2341A), said bolt (2341B), said drainage hole (2341C), said bracket (2341D) and said screw hole (2341E) are protected by said masking members of the present invention from the coating of visco-elastic material.

We claim:

1. A method of masking a selected surface of a metal structure during the application of a coating of visco-elastic material directly onto said metal structure for the purpose of corrosion, sound and vibration proofing the metal structure which comprises applying to said selected surface of said metal structure a vacuum-formed thermoplastic foam masking member made from thermoplastic foam sheet having an expansion ratio in the range 2–20, a thickness in the range 0.5–5 mm and having a configuration suitable for application to said selected surface and for being struck or stuck by a hook for removal from said selected surface, applying a coating of said visco-elastic material to said metal structure including the application of said visco-elastic material onto said masking member applied to said metal structure and removing the resulting visco-elastic coated masking member from said selected surface of said metal structure by striking and sticking said masking member with a hook to leave behind said selected surface of said metal article substantially free of said visco-elastic material.

2. A method in accordance with claim 1 wherein said masking member applied to said selected surface of said metal article has a thermoplastic film laminated on one or both sides thereof.

3. A method in accordance with claim 1 wherein said thermoplastic foam thermoplastic film masking member comprises polystyrene foam.

4. A method in accordance with claim 1 wherein the applied masking member has a thermoplastic film laminated on one or both sides thereof and wherein said thermoplastic film is made of the same thermoplastic material as said thermoplastic foam walled masking member.

* * * * *